United States Patent [19]

Kawaguchi et al.

[11] 4,388,189

[45] Jun. 14, 1983

[54] PROCESS FOR PREPARATION OF IMPROVED SEMIPERMEABLE COMPOSITE MEMBRANES

[76] Inventors: Takeyuki Kawaguchi, 1-28-5-207, Ozu-cho; Hiroyoshi Minematsu, 1-28-5-302, Ozu-cho, both of Iwakuni-shi, Yamaguchi-ken; Yuzuru Hayashi, 3-1-23; Shigeyoshi Hara, 3-1-40, both of Yamate-machi, Iwakuni-shi, Yamaguchi-ken, all of Japan

[21] Appl. No.: 220,081

[22] Filed: Dec. 24, 1980

[30] Foreign Application Priority Data

Dec. 28, 1979 [JP] Japan .................. 54-170359

[51] Int. Cl.$^3$ ............................................. B01D 31/00
[52] U.S. Cl. .................. 210/490; 210/500.2; 427/245
[58] Field of Search ............... 210/500.2, 490, 321.1; 427/244, 245, 246

[56] References Cited

U.S. PATENT DOCUMENTS

| | | |
|---|---|---|
| 3,133,132 | 5/1964 | Loeb et al. |
| 3,133,137 | 5/1964 | Loeb et al. |
| 3,567,632 | 3/1971 | Richter et al. |
| 3,951,815 | 4/1976 | Wrasidlo |
| 4,005,012 | 1/1977 | Wrasidlo |
| 4,039,440 | 8/1977 | Cadotte |
| 4,265,745 | 5/1981 | Kawaguchi et al. ............ 210/500.2 |

FOREIGN PATENT DOCUMENTS 1536227  12/1978  United Kingdom .

*Primary Examiner*—Frank A. Spear, Jr.

[57] ABSTRACT

In a process for producing a semipermeable composite membrane which comprises forming on a microporous substrate a thin layer of a polymeric material comprising a polyamino polymer containing at least 1 milliequivalent, per gram of the polymer in the dry state, of active amino groups selected from primary amino groups and secondary amino groups, and thereafter interfacially crosslinking a surface portion of said thin layer with a crosslinking agent having at least two functional groups (a) capable of easily reacting with either the primary or secondary amino groups or both in said polymer; the improvement wherein (1) said polymeric material contains dispersed therein a polyfunctional compound having at least two functional groups (b) substantially incapable of reacting with the primary or secondary amino groups in said polymer at a temperature at which the interfacial crosslinking is carried out, but capable of reacting easily with either the primary or secondary amino groups or both in said polymer at a temperature at least 30° C. higher than said crosslinking temperature, and (2) the interfacially crosslinked thin layer is heated to a temperature at which said polyfunctional compound reacts with the primary or secondary amino groups or both in said polymer.

32 Claims, No Drawings

PROCESS FOR PREPARATION OF IMPROVED SEMIPERMEABLE COMPOSITE MEMBRANES

This invention relates to a process for producing a permselective composite membrane. More specifically, it relates to a process for producing a permselective composite membrane which has high salt rejection and water flux, durability, pressure compaction resistance, chemical resistance, oxidation resistance, soiling resistance and heat resistance, can be stored in the dried state, and is suitable for ultrafiltration or reverse osmosis, especially the latter.

The permselective membrane is a membrane which has selective permeability to specified molecules. It is frequently used to remove very small amounts of contaminated molcules dissolved or diffused in a liquid or gas.

In recent years, reverse osmosis has attracted a great deal of interest for utilization in fields involving purification of liquids. This is of especial importance when utilizing this system in the purification of water and brackish water. Likewise, the process is also used to remove impurities from liquids such as water or, in the fields of dialysis, blood. When utilizing reverse osmosis in the purification of saline water, a pressure in excess of the osmotic pressure of the feed solution is applied to the solution from which purified water is prepared. Pure water diffuses through the membrane while the sodium chloride molecules or other impurities which may be present in the water are retained by the membrane.

The efficiency of the reverse osmosis method is greatly affected by the properties of the permselective membrane used. Much effort has therefore been made to develop membranes having high performance, and resulted in some specific proposals.

For example, U.S. Pat. Nos. 3,133,132 and 3,133,137 disclose the early Loeb-type membranes made of cellulose diacetate. These membranes are asymmetric membranes which are characterized by a very thin, dense surface layer or skin that is supported upon an integrated much thicker supporting layer. These known membranes based on cellulose diacetate have the defect of poor pressure compaction resistance, low resistance to chemical and biological degradation, a short service life, and insufficient flux and salt rejection characteristics.

In an attempt to overcome these defects of the Loeb-type membranes, some membranes composed basically of synthetic polymers have recently been suggested. For example, U.S. Pat. No. 3,567,632 proposed a reverse osmosis membrane having a wholly aromatic polyamide as a base. Although this membrane has achieved a great improvement in hydrolysis resistance and biodegradation resistance, it does not surpass the Loeb-type membrane in regard to the two basic properties, i.e. water flux and salt rejection. Moreover, it still has the defect that its pressure compaction resistance is low and it cannot be stored in the dry state.

These membranes are called heterogeneous membranes prepared by a so-called "phase separation method", and the semipermeable homogeneous layer participating in separation and the porous support layer having to do with the reinforcing of the membrane are made of the same material.

Some methods were suggested in which a porous layer is prepared from a separate material, and a hydrophilic reactive polymer and a crosslinking agent are reacted on the porous layer to form a crosslinked film-like semipermeable layer thereon. It was suggested that by these methods, there can be obtained a semipermeable composite membrane having greatly improved hydrolysis resistance, biodegradation resistance, pressure compaction resistance and storability in the dried state in addition to improved basic properties. For example, U.S. Pat. No. 3,951,815 discloses a composite semipermeable membrane comprising a microporous substrate and an ultrathin film formed of a crosslinked, grafted polyethylenimine disposed on one surface of said microporous substrate that has been crosslinked with a di- or tri-functional compound such as isophthaloyl chloride and grafted with a graft reactant such as acrylonitrile or epichlorohydrin. U.S. Pat. No. 4,005,012 describes a composite semipermeable membrane comprising an ultrathin film formed by contacting an amine-modified polyepihalohydrin with a polyfunctional agent on a microporous substrate to form this film on one surface of the microporous substrate. Also, U.S. Pat. No. 4,039,440 discloses a reverse osmosis membrane prepared in situ on a porous support by initial formation of a layer of polyethyleneimine on the support, followed by interfacial reaction with a polyfunctional reagent to produce a thin surface coating which possesses salt barrier characteristics.

The membrane composed basically of crosslinked polyethyleneimine disclosed in U.S. Pat. No. 4,039,440 has a high salt rejection, but has the defect of possessing insufficient water flux and low oxidation resistance (e.g., low resistance to deterioration by the presence of chlorine in the feed saline or brackish water). As one method of improving the oxidation resistance, U.S. Pat. No. 3,951,815 suggests the grafting of acrylonitrile to the polyethyleneimine. The acrylonitrile-grafted and crosslinked polyethyleneimine shows some improvement in oxidation resistance, but suffers from the serious defect that its water flux is markedly reduced. The membrane composed basically of the amine-modified polyepihalohydrin disclosed in U.S. Pat. No. 4,005,012 exhibits a high salt rejection but its water flux is not sufficient. It has been strongly desired therefore to develop membranes having a higher water flux.

The aforesaid semipermeable composite membrane composed of the interfacial crosslinked product of polyethyleneimine or amine-modified polyepichlorohydrin may contain primary and/or secondary amino groups and/or secondary amide groups

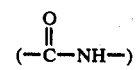

which are susceptible to oxidation or soil deposition remain in the cross-linked polymer. In order to reduce the amount of residual reactive sites which may possibly undergo oxidative attack or soil deposition in such a crosslinked product, there was suggested a method comprising blocking these sites by grafting a reagent which induces addition reaction at these reactive sites (see British Patent No. 1,536,227 and U.S. Pat. No. 3,951,815). The British Patent discloses a grafting method which comprises impregnating a crosslinked composite membrane with a grafting reagent (to be referred to as the method 1); a grafting method comprising grafting the reagent to the membrane before crosslinking, and then performing the cross-linking reaction of the membrane (to be referred to as the method 2); and a grafting method which comprises performing the crosslinking reaction and the grafting reaction simultaneously (to be referred to as the method 3). According to the method 1, since the surface layer of the membrane is rendered compact by the interfacial crosslinking before the grafting reaction, the penetration of the grafting reagent is insufficient and the unreacted amino groups or secondary amide groups still remain in large amounts in the interior layer. Hence, it is difficult to improve the resistance of the membrane to oxidation or soiling. According to the method 2, if the grafting reaction before the interfacial cross-linking reaction is performed sufficiently, the amount of amino groups to be involved in the subsequent interfacial crosslinking reaction decreases even at the surface layer, and therefore, the crosslinking density of the surface layer becomes insufficient, thus making it impossible to obtain a semipermeable composite membrane having excellent properties. On the contrary, an attempt to increase the crosslinking density of the surface layer by inhibiting the grafting reaction results in an insufficient effect of grafting in the interior layer, making it difficult to obtain a composite membrane of excellent properties. According to the method 3, unless there is a considerable difference in reactivity with the amino groups between the grafting agent and the crosslinking agent, the grafting agent and the crosslinking agent competitively react with the amino groups. For this reason, the crosslinking density is not sufficiently high even at the surface of the membrane which is to form an active layer, and it is difficult to obtain a membrane having suitable salt rejecting characteristics.

The present inventors have disclosed that crosslinked permselective composite membranes having improved oxidation resistance, etc. can be produced by using water-soluble polymers containing substantially only secondary amino groups (see Japanese Laid-Open Patent Publications Nos. 146800/78, 2980/79, and 3153/79). Since in these membranes, too, the polymer in the interior layer is not crosslinked and is still water-soluble, it gradually flows out during the course of a long-term operation, and this may possibly lead to a degradation in the strength and performance of the membranes. Thus, the durability of these membranes is not satisfactory. This phenomenon is observed not only in crosslinked composite membranes obtained from a polymer having secondary amino group, but also in crosslinked composite membranes obtained from other amine-containing polymers whose thermal self-gellability is not sufficient. The durability of these membranes can be increased by performing the thermal self-gellation of these polymers at a very high temperature. But this results in increased durability at the sacrifice of a drastic degradation in membrane performance, especially water flux.

It has been strongly desired therefore to develop a technique which can meet the inconsistent requirements of maintaining the water flux at a high level and of increasing the durability.

It is an object of this invention to provide a process for producing a semipermeable composite membrane with water-insoluble interior layer, which has excellent durability, very good water flux and salt rejection.

Another object of this invention is to provide a process for producing a semipermeable composite membrane which has a very high water flux and salt rejection, excellent durability, oxidation resistance and soiling resistance, and improved pressure compaction resistance, chemical resistance, heat resistance and storability in the dry state.

Still another object of this invention is to provide a semipermeable composite membrane of high performance which is produced by such a process.

Other objects and advantages of this invention will become apparent from the following detailed description.

According to this invention, there is provided a process for producing a semipermeable composite membrane which comprises forming on a microporous substrate a thin layer of a polymeric material comprising a polyamino polymer containing at least 1 milliequivalent, per gram of the polymer in the dry state, of active amino groups selected from primary amino groups and secondary amino groups, and thereafter interfacially crosslinking a surface portion of said thin layer with a crosslinking agent having at least two functional groups (a) capable of easily reacting with either the primary or secondary amino groups or both in said polymer; characterized in that (1) said polymeric material contains dispersed therein a polyfunctional compound having at least two functional groups (b) substantially incapable of reacting with the primary or secondary amino groups in said polymer at a temperature at which the interfacial crosslinking is carried out, but capable of reacting easily with either the primary or secondary amino groups or both in said polymer at a temperature at least 30° C. higher than said crosslinking temperature, and (2) the interfacially crosslinked thin layer is heated to a temperature at which said polyfunctional compound reacts with the primary or secondary amino groups or both in said polymer.

The basic concept of this invention consists in the fact that a polyfunctional compound having substantially lower reactivity with active amino groups than the interfacial crosslinking agent is incorporated beforehand into the polyamino polymer used to form the semipermeable membrane layer of the semipermeable composite membrane, and after the interfacial crosslinking, a crosslinking reaction is induced between the polyamino polymer and the polyfunctional compound to form an internal anchor layer rendered water-insoluble by the crosslinking and having markedly improved oxidation resistance, soiling resistance, pressure compaction resistance (or mechanical strength), etc. between the ultrathin semipermeable layer on the surface and the microporous substrate.

The polyamino polymer used to form the semipermeable membrane layer in the process of this invention has film formability by itself, contains at least 1 milliequivalent, preferably at least 2.0 milliequivalents, more preferably at least 5.0 milliequivalents, per gram of the polymer in the dry state, of active amino groups selected from primary amino groups and secondary amino groups in the main chain and/or side chain of the polymer. Any of those polyamino polymers which contain the active amino groups in such an amount and which have heretofore been used for the production of semipermeable membranes can be used in this invention. Polyamino polymers containing 2.0 to 23.0 milliequivalents, particularly 5.0 to 23.0 milliequivalents, per gram of the dry polymer, of the active amino groups are especially suitable for use in this invention.

The polyamino polymer should have the property of forming a continuous ultrathin film on the microporous substrate, and desirably has a number average molecular weight of generally 500 to 200,000, preferably 700 to 150,000, more preferably 1,000 to 100,000. Advantageously, the polyamino polymer has an intrinsic viscosity $[\eta]$, determined at 20° C. for a 1/10 N NaCl aqueous solution, of generally 0.05 to 5.0 dl/g, preferably 0.07 to 3.0 dl/g, more preferably 0.1 to 2.0 dl/g.

The polyamino polymer is applied in solution in the form of a solution to the substrate as is done in the prior art. Accordingly, the polyamino polymer should be soluble in a solvent. For ease of operation, the solvent is desirably water, a water-miscible organic solvent having a boiling point of not more than 140° C., preferably not more than 120° C., or a mixture of water and the organic solvent, or a mixture of the organic solvents with each other. Advantageously, the polyamino-polymer used in this invention dissolves in at least one solvent selected from water and water-miscible organic solvents having a boiling point of not more than 140° C., preferably not more than 120° C., to an extent of at least generally at least 0.2 g/100 ml of the solvent, preferably at least 0.5 g/100 ml of the solvent, more preferably at least 1 g/100 ml of solvent, at 20° C.

The polyamino polymer contains structural units composed of a primary and/or a secondary amino group and a hydrocarbon group having 2 to 20 carbon atoms, preferably 2 to 15 carbon atoms, which may contain in addition to the amino group, a nitrogen atom (N), an oxygen atom (O), a halogen atom (e.g., chlorine or bromine), or a sulfur atom (S) as a heteroatom. When there is a hetero atom, it may exist in various forms. For example, the nitrogen atom may exist in the form of a tertiary or quaternary amino group; the oxygen atom may exist in the form of an ether linkage, an ester linkage, a carbonyl linkage or a hydroxyl group; and the halogen atom may exist as a substituent for hydrogen.

Examples of preferred structural units are those of the following general formula (I), (II), (III) and (IV).

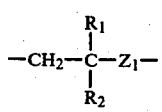 (I)

wherein $Z_1$ represents a direct bond, —O—,

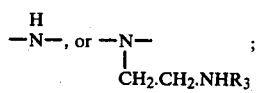

$R_1$ represents a hydrogen atom or a methyl group; when $Z_1$ is

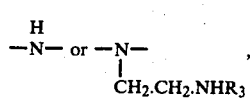

$R_2$ represents a hydrogen atom, and when $Z_1$ represents a direct bond or —O—, $R_2$ represents the group —Y—$R_4$; $R_3$ represents an alkyl group having 1 to 5 carbon atoms; Y represents a direct bond, —O—,

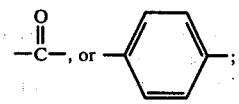

$R_4$ represents the group —$NHR_5$, —$R_6$—$NHR_7$; $R_5$ and $R_7$ represent an alkyl group having 1 to 5 carbon atoms; and $R_6$ represents a divalent aliphatic group (e.g., alkylene group) having 1 to 5 carbon atoms which may contain an oxygen atom.

$$-Z_2-CH_2-\underset{OH}{\underset{|}{CH}}-CH_2-NH- \quad (II)$$

wherein $Z_2$ represents a direct bond or —O—.

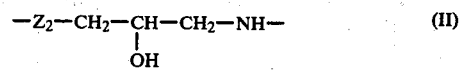 (III)

wherein $R_8$ represents a halogen atom or the group —$NHR_{10}$; $R_9$ represents the group —$NHR_{10}$; and $R_{10}$ represents a hydrogen atom or an alkyl group having 1 to 5 carbon atoms.

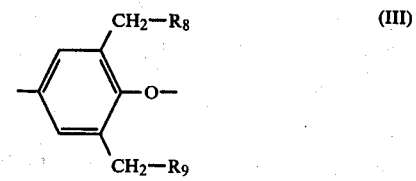 (IV)

wherein $R_{11}$ and $R_{12}$, independently from each other, represent a hydrogen atom or a methyl group, and $Z_3$ represents a direct bond or —$SO_2$—.

The proportion of the structural unit in the polyamino polymer is selected such that the proportion of the primary and secondary amino groups present in the structural unit is within the range specified hereinabove.

The polyamino polymer used in this invention may include those which gel by itself upon heating or those which have no self-gelling ability. When the process of this invention is carried out using a polyamino polymer of the self-gelling type having too low a gelling temperature, its self-gellation is likely to proceed substantially before the reaction of the active amino group in the polymer with the polyfunctional compound is substantially completed. It is very desirable therefore that the polyamino polymer used in this invention, even if when it is of the self-gelling type, should not gel at a temperature below 50° C., preferably below 60° C.

Specific examples of the polyamino polymer are given below. It is to be understood that these examples are merely illustrative to facilitate an understanding of the invention, and do not in any way limit the scope of this invention.

(I) Polyamino polymers which have only primary amino groups in the polymer molecule as amino groups having an active hydrogen atom (active amino groups)

and do not gel by itself at a temperature of 150° C. or below:

Typical examples of the polyamino polymer which belongs to this group are as follows:

(a) Polyvinyl amine type polymers which are homopolymers or copolymers having structural units of the formula

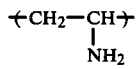

(b) Polyaminostyrene-type polymers which are homopolymers or copolymers having structural units of the formula

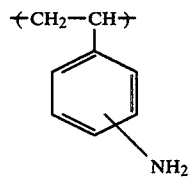

(c) Polyallylamine-type polymers which are homopolymers or copolymers having structural units of the formula

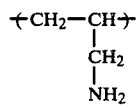

(d) Homopolymers or copolymers having structural units of the formula

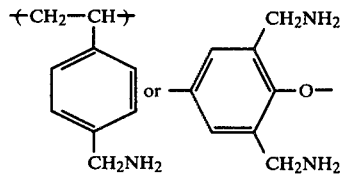

(see, for example, European Patent Publication No. 10,425).

(II) Polyamino polymers which contain only primary amino groups as the active amino groups in the polymer molecule and have self-gelling ability at an elevated temperature:

Typical examples of the polyamino polymer of this group are as follows:

(a) Partially ammonia-modified polyepichlorohydrin which is a polymer consisting mainly of structural units of the formula

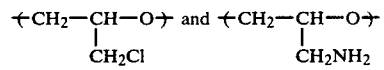

for example, the polymer described in U.S. Pat. No. 4,005,012.

(b) Partially ammonia-modified poly(chloroethyl vinyl ether) which is a polymer consisting mainly of structural units of the formulas

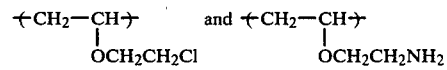

(for example, the polymer described in European Patent Publication No. 10,425).

(c) Partially hydrazine-modified poly(meth)acrylate which is a polymer consisting mainly of structural units of the formulae

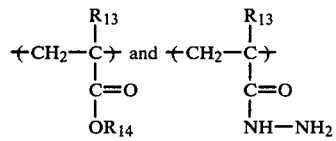

wherein $R_{13}$ represents a hydrogen atom or a methyl group, all $R_{13}$ groups may not always be the same, and $R_{14}$ represents an alkyl group having 1 to 4 carbon atoms, for example the polymer described in European Patent Publication No. 8945.

(d) Ammonia-modified polyglycidyl (meth)acrylate which is a polymer consisting mainly of structural units of the formula

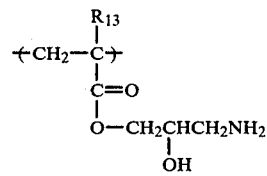

wherein $R_{13}$ is the same as defined hereinabove, for example the polymer described in European Patent Publication No. 10,425.

(III) Polyamino polymers which have both a primary amino group and a secondary amino group in the polymer molecules and do not have self-gelling property at an elevated temperature:

Typical polyamino polymers of this group are the polyaddition products between polyepoxy compounds and polyamino compounds having at least two active amino groups which are disclosed in DAS No. 2822784. More specific examples are polymers consisting mainly of the following structural units.

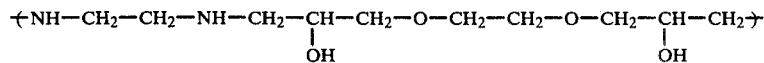

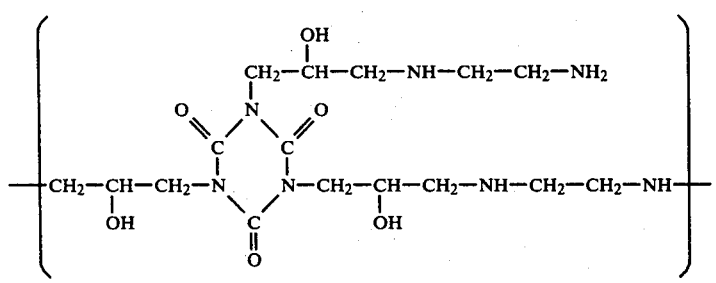
(b)

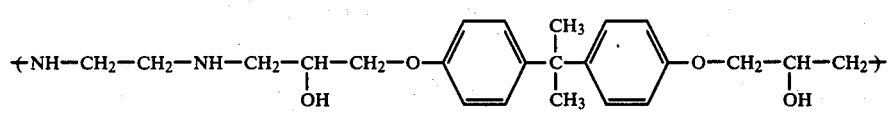
(c)

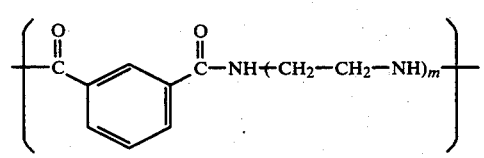
(d)

(m ≧ 1)

(IV) Polyamino polymers containing both a primary amino group and a secondary amino group as the active amino groups in the polymer molecule and having self-gelling ability at an elevated temperature:

Examples of the polyamino polymers of this group are as follows:

(a) Polyethyleneimine consisting mainly of structural units of the formula

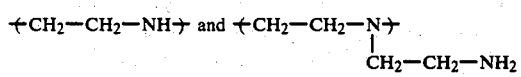

Particularly the one described in U.S. Pat. No. 4,039,440.

(b) Polyamine-modified polyepichlorohydrin, for example a polymer consisting mainly of structural units of the formula

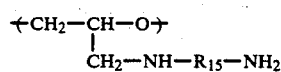

wherein $R_{15}$ represents an aliphatic hydrocarbon radical containing 2 to about 15 carbon atoms which may contain a nitrogen atom in the form of a primary, secondary or tertiary amino group and an oxygen atom in the form of a hydroxyl group or ether bond, an alicyclic hydrocarbon containing from about 4 to about 8 carbon atoms in the ring, or a heterocyclic radical, which is described in U.S. Pat. No. 4,005,012.

(c) Polyamine-modified poly(2-chloroethylvinyl ether), for example a polymer consisting mainly of structural units of the formula

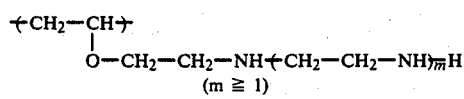
(m ≧ 1)

especially the one described in European Patent Publication No. 10,425.

(V) Polyamino polymers which have only secondary amino groups as the active amino groups and do not have self-gelling ability at an elevated temperature:

The polyamino polymers of this group include polymers consisting of structural units of formula (IV) given hereinabove particularly structural units of the formula

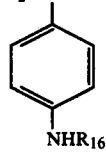

and polymers consisting mainly of at least one structural units selected from the following group:

(a) $-CH_2-CH_2-NH-$  (b) 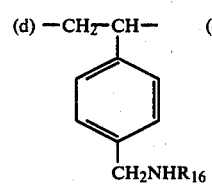

(c) $-CH_2-CH-$
         $|$
         $NHR_{16}$ (d) 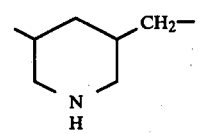   (e) 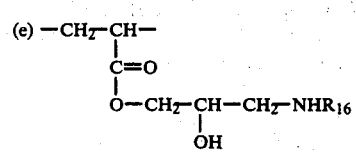

(f) $+CH_2-CH_2-NH+$ and $+CH_2-CH_2-N+$
                                          $|$
                                          $CH_2-CH_2-NHR_{16}$ (g) $-CH_2-CH-O-$
         $|$
         $CH_2-NH+CH_2-CH_2-NH)_{\overline{m}}R_{16}$
         (m ≧ 1)

(for example, U.S. Pat. No. 4,005,012) wherein $R_{16}$ represents an alkyl group having 1 to 5 carbon atoms.

(VI) Polymers which have only secondary amino groups as the active amino groups in the polymer molecules and have self-gelling ability at an elevated temperature:

The polyamino polymers of this group include polymers consisting mainly of structural units selected from the following group:

(a) 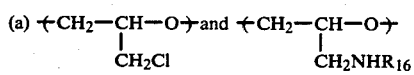

(for example, Japanese Laid-Open Patent Publication No. 67573/79)

(b) 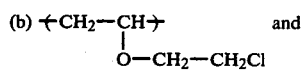

and

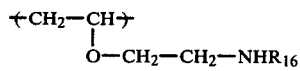

(for example, U.S. patent application Ser. No. 86,192 filed Nov. 15, 1979.)

(c) 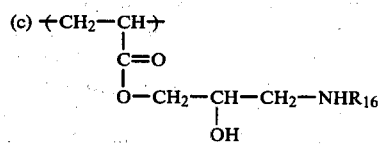

(d) 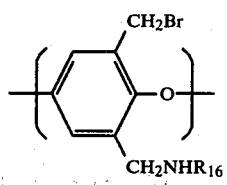   (e) 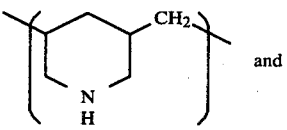

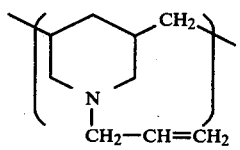

In the above formulae, $R_{16}$ is as defined hereinabove.

It should be understood that the disclosures of the patent specifications cited herein in the exemplification of the polyamino polymer form part of the specification of the present application.

Among the above polyamino polymers, those which can be preferably used in this invention are the polymers (A) to (D) below.

(A) The addition polymer between a polyepoxy compound and a polyamine compound having at least two active amino groups which is described, for example, in DAS No. 2822784.

(B) Polyethylenimine, Polyamine-modified polyepichlorohydrin and polyamine-modified poly(2-chloroethylvinyl ether) (see U.S. Pat. Nos. 4,039,440 and 4,005,012 and European Patent Publication No. 10,425).

(C) Polymers containing at least 30 mole% of structural units of the following formula

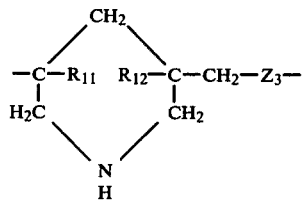

wherein $R_{11}$, $R_{12}$ and $Z_3$ are as defined hereinabove (see U.K. Patent Application GB No. 2027614).

(D) Polymers consisting mainly of two structural units of the formulae

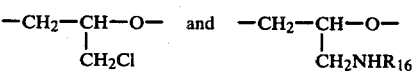

or of two structural units of the formulae

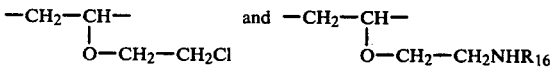

wherein $R_{16}$ is as defined above, (see Japanese Patent Publication No. 67573/79 and European Patent Publication No. 10,425).

When those polyamino polymers which do not have self-gelling ability at an elevated temperature are used, it is possible to improve long-term durability and pressure compaction resistance of the resulting permselective composite membrane. Particularly, when the polyamino polymer has only secondary amino groups as the active amino groups, a properly chosen polyfunctional compound included in the polymer reacts under heat with the amino groups remaining in the membrane after the interfacial crosslinking reaction, and consequently, the membrane finally obtained is substantially free from secondary amino groups which are susceptible to oxidation. Hence, the oxidation resistance as well as the durability and pressure compaction resistance of the membrane can be improved.

The polyfunctional compound may be included in a polyamino polymer which has self-gelling ability at an elevated temperature. By so doing, the crosslinking of the polymer can be induced at a temperature lower than the ordinary self-gelling temperature (usually 100° C. or more higher) of the polymer. This can obviate severe heating required for self-gellation, and therefore, the reduction of the molecular weight of the polymer and the heat decomposition of the amino groups can be prevented and the resulting composite film has excellent performance.

The inclusion of the polyfunctional compound is also conductive to adjustment of the flexibility or hydrophilicity of the membrane in addition to the improvement of its durability, pressure compaction resistance and oxidation resistance.

The polyfunctional compound included in the polyamino polymer in accordance with the aforesaid basic concept of this invention is a compound having per molecule at least two functional groups (b) substantially incapable of reacting with the primary or secondary amino groups in the polymer at a temperature at which the interfacial crosslinking is carried out but capable of easily reacting with either the primary or secondary amino groups or both in the polymer.

The term "substantially incapable of reacting" used herein in regard to the functional groups (b) means that the functional groups (b) of the polyfunctional compound mixed in the polyamino polymer do not at all react with the polymer within 30 minutes at the temperature in question, e.g. the temperature at which the interfacial crosslinking is carried out, or even when the reaction does occur, the amount of the functional groups (b) reacted is at most 10 mole%, preferably at most 5 mole%, of the entire functional groups (b).

Likewise, the term "capable of easily reacting" used herein in regard to the functional groups (b) and the functional groups (a) to be described means that the functional groups can react with the polymer at the temperature in question to an extent of at least 30 mole%, preferably at least 50 mole%.

The functional groups (b) present in the polyfunctional compound can be selected from a wide range of compounds which meet the aforesaid requirements. Advantageously, they are functional groups which do not substantially react with any of the primary and secondary amino groups in the polymer at a temperature of not more than 20° C., preferably not more than 30° C., but can easily react with either the primary or secondary amino groups or both in the polymer at a temperature of at least 70° C., but lower than the self-gelling temperature (T°C.) of the polyamino polymer, preferably not more than (T−20)° C.

The self-gelling temperature, as used herein, denotes a temperature at which 70% by weight of a polyamino polymer becomes water-soluble when a solution of of the polyamino polymer alone in the same concentration as the polyamino polymer in the thin layer to be subjected to interfacial crosslinking reaction is maintained for 30 minutes.

The type of the functional groups (b) meeting this requirement differs depending upon the types of the primary and/or secondary amino groups in the polyamino polymer, the mode of bonding thereof in the polymer structure, etc., but generally they can be selected from the following group.

—CH(OH)CH$_2$X$_1$, —COOA$_1$, —NHCOOA$_2$,

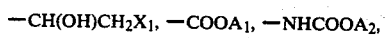

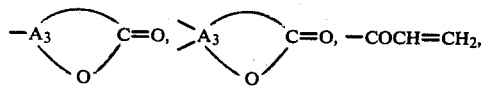

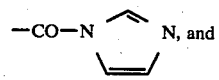

active halomethyl groups.

In the above formulae, X$_1$ represents a halogen atom, A$_1$ and A$_2$ each represent a hydrogen atom or an organic radical capable of being split off together with the oxygen atom to which it is bonded, and A$_3$ represents a trivalent or tetravalent saturated aliphatic group having 2 to 5 carbon atoms.

The "halogen atom" represented by X$_1$ denotes four elements, fluorine, chlorine, bromine and iodine, the chlorine atom being preferred. Examples of the "organic radical capable of being split off together with the oxygen atom to which it is bonded" represented by A$_1$ and A$_2$ are —CH$_3$, —C$_2$H$_5$, —C$_3$H$_7$, —C$_4$H$_9$, —CH$_2$CH=CH$_2$, —CH$_2$—C$_6$H$_5$ and —C$_6$H$_5$. Specific examples of the "trivalent or tetravalent saturated aliphatic group having 2 to 5 carbon atoms" are

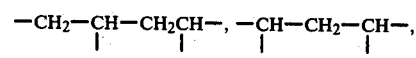

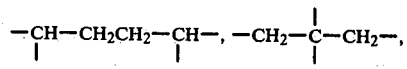

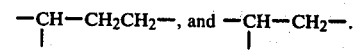

The term "active halomethyl group" denotes the group —CH$_2$X a benzyl group, an allyl group, etc. in which X is a halogen atom, preferably Cl and Br.

Typical examples of the functional groups (b) are given below.

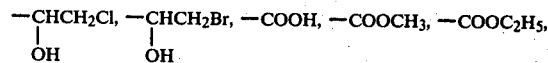

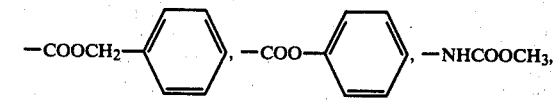

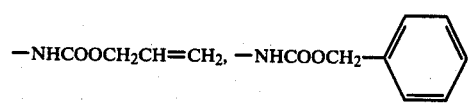

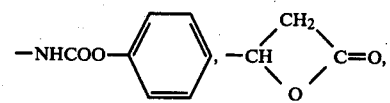

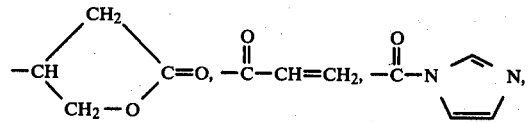

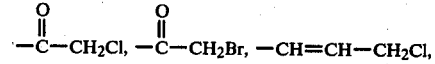

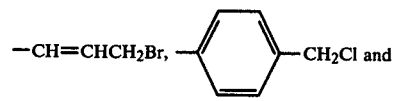

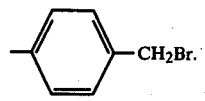

The polyfunctional compound used in this invention has at least two such functional groups (b) per molecule, and the two or more functional groups (b) may be identical or different.

Since the polyfunctional compound is used as a uniform dispersion in the polyamino polymer, it is very desirable that it be soluble to some extent in a solvent for the polymer, i.e. at least one solvent selected from water and water-miscible organic solvents having a boiling point of not more than 140° C. Generally, it is advantageous that the polyfunctional compound be soluble at 20° C. in the solvent to an extent of at least 0.1 g/100 ml of solvent, preferably at least 0.2 g/100 ml of solvent, more preferably at least 0.5 g/100 ml of solvent.

The type of the polyfunctional compound used in this invention is not particularly limited so long as it has at least two functional groups (b) and shows the above-mentioned solubility. It may be of low to high molecular weight.

Suitable low-molecular-weight polyfunctional compounds are organic compounds, especially aliphatic organic compounds, generally containing 2 to 4, preferably 2 or 3, such functional groups (b) per molecule and having a molecular weight of 90 to 500, preferably 100 to 500. Suitable high-molecular-weight polyfunctional compounds are high-molecular-weight polyfunctional organic compounds, especially vinyl polymers, which contain the functional groups (b) in an amount of 2.0 to 15.0 milliequivalents, especially 5.0 to 15.0 milliequivalents, per gram of the compounds, and have a number average molecular weight of 1,000 to 100,000, preferably 2,000 to 10,000.

Typical examples of the polyfunctional compound that can be used in this invention are as follows:

(A) Low-molecular-weight polyfunctional compounds

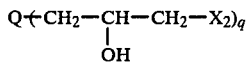  (i)

wherein $X_2$ represents a halogen atom, preferably a chlorine atom, Q represents an alkyl group having 2 to 20 carbon atoms which may contain an oxygen or a halogen atom, a direct bond or an ether linkage, and q is an integer of 2 to 6.

Specific examples are as follows:

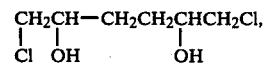

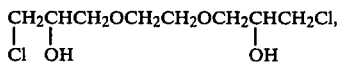

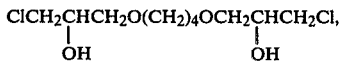

-continued

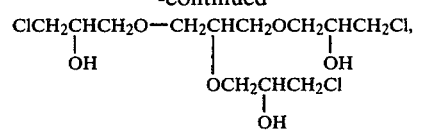

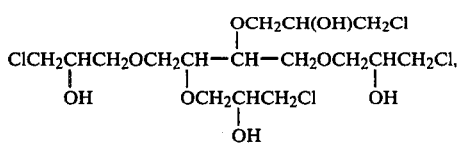

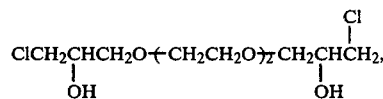

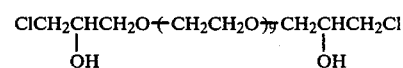

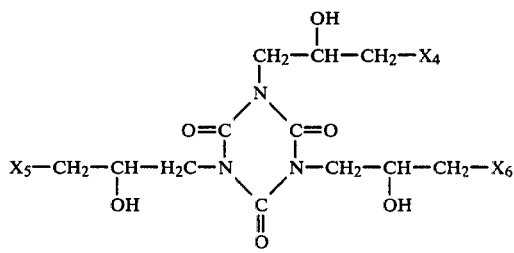

(ii)

wherein $X_4$, $X_5$ and $X_6$ each represent a halogen atom, preferably a chlorine atom.

  (iii)

wherein $A_5$ represents a hydroxyl group, a sulfonic acid salt group, a carboxylic acid salt group, an aliphatic group containing 1 to 12 carbon atoms and having a valence of a which may contain an oxygen or halogen atom, an aromatic group containing 6 10 carbon atoms and having a valence of a, or an alicyclic group containing 5 or 6 carbon atoms and having a valence of a, $A_6$ represents an alkyl group having 1 to 4 carbon atoms, an allyl group, an aralkyl group having 7 to 10 carbon atoms, or a phenyl group, and a is an integer of 2 to 4.

The "aliphatic group" may be of linear or branched chain, and saturated or unsaturated (containing a double bond), and the "aromatic group" may consist of a benzene ring.

Specific examples of the compounds (iii) are as follows:

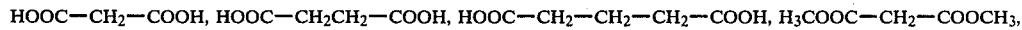

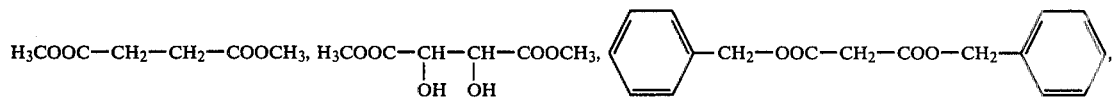

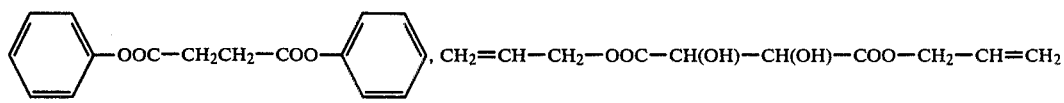

-continued

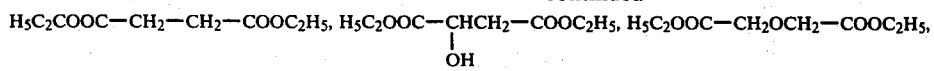

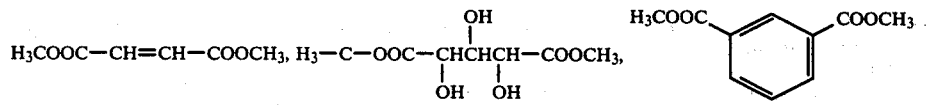

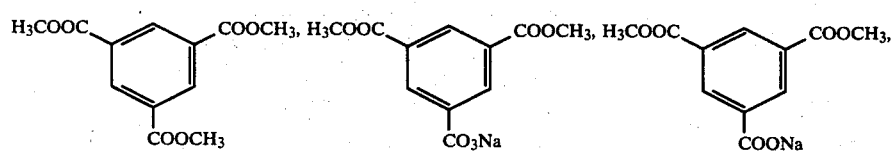

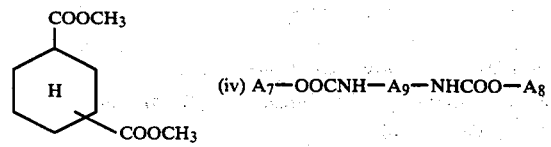

(iv) A₇—OOCNH—A₉—NHCOO—A₈ wherein A₇ and A₈ each represent an alkyl group having 1 to 4 carbon atoms, an allyl group, an aralkyl group having 7 to 10 carbon atoms, or a phenyl group, and A₉ represents an alkylene group having 2 to 10 carbon atoms, or an arylene group which may be substituted by a halogen atom or an alkyl atom having 1 to 6 carbon atoms.

Specific examples of the compounds (iv) are given below.

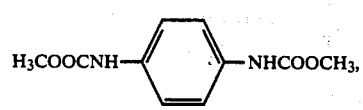

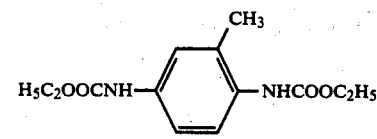

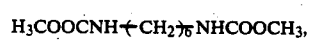

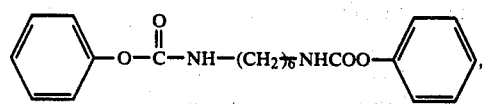

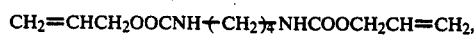

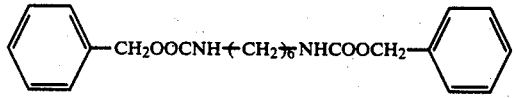

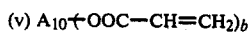

(v) A₁₀(OOC—CH=CH₂)_b wherein A₁₀ represents a hydroxyl group, a sulfonic acid salt group, a carboxylic acid salt group, an aliphatic group containing 1 to 12 carbon atoms and having a valence of b which may contain an oxygen or halogen atom, an aromatic group containing 6 to 10 carbon atoms and having a valence of b, or an alicyclic group containing 5 or 6 carbon atoms and having a valence of b, and b is an integer of 2 to 4.

Specific examples of the compounds (v) include the following.

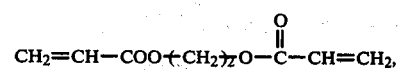

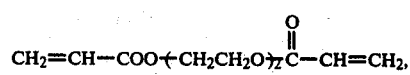

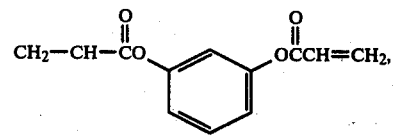

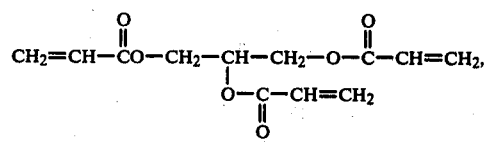

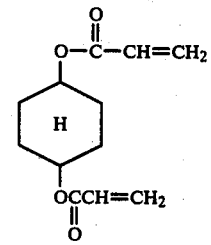

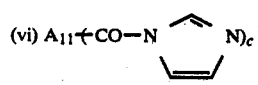

(vi) A₁₁(CO—N⟨N⟩)_c wherein $A_{11}$ represents a hydroxyl group, a sulfonic acid salt group, a carboxylic acid salt group, an aliphatic group containing 1 to 12 carbon atoms and having a valence of c which may contain an oxygen or halogen atom, an aromatic group containing 6 to 10 carbon atoms and having a valence of c, or an alicyclic group containing 5 or 6 carbon atoms and having a valence of c, and c is an integer of 2 to 4.

Specific examples of the compounds (vi) are as follows:

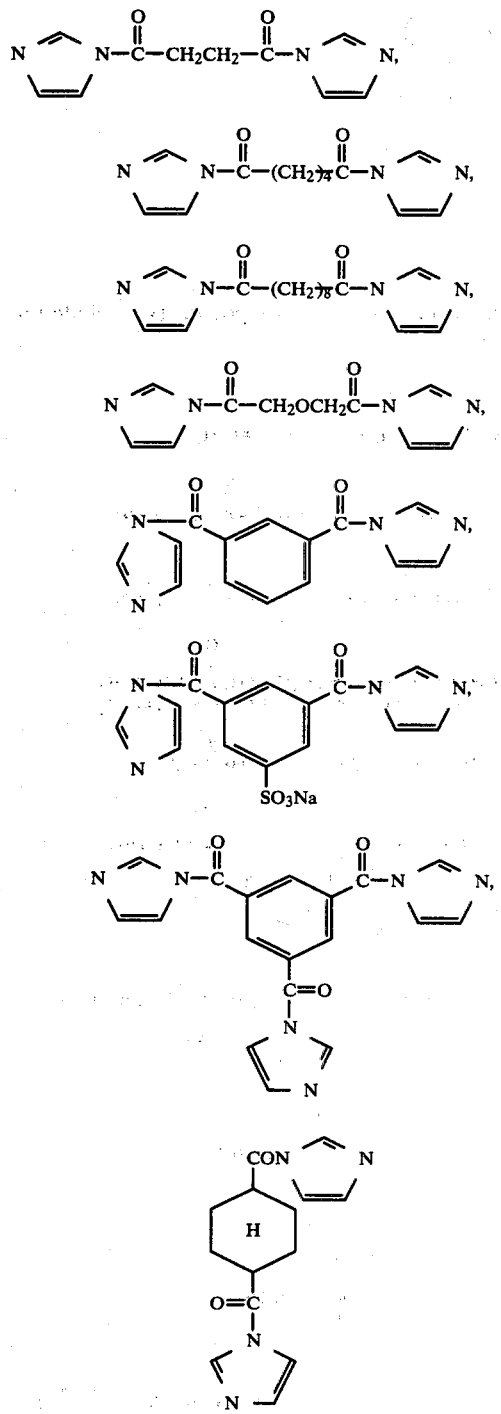

(vii) $X_7$—$CH_2$—$COO$—$A_{12}$ wherein $X_7$ represents a halogen atom, and $A_{12}$ represents an alkyl group having 1 to 4 carbon atoms, an allyl group, a phenyl group and an aralkyl group having 7 to 10 carbon atoms.

Examples of the compounds (vii) include the following.

$ClCH_2COOH$, $BrCH_2COOH$, $ClCH_2COOCH_3$,
    $ClCH_2COOC_2H_5$, $ClCH_2COOCH_2CH=CH_2$, $ClCH_2COO$—⌬, $ClCH_2COOCH_2$—⌬

Among the above examples, especially preferred low-molecular-weight polyfunctional compounds (i) to (vii) are shown below.

$ClCH_2CHCH_2O\!+\!CH_2CH_2O\!)_{\overline{2-9}}CH_2CHCH_2Cl$ (i)
    $|$                                 $|$
    $OH$                            $OH$ (ii) triazine-trione with $CH_2CHCH_2Cl$/$OH$ substituents $CH_3OOCCHCHCOOCH_3$, $C_2H_5OOC$—$CHCHCOOC_2H_5$, (iii)
    $|$    $|$                         $|$     $|$
    $OH$ $OH$                     $OH$ $OH$ $CH_2=CHCH_2O\overset{O}{\overset{\|}{C}}-CH_2CH_2COOCH_2CH=CH_2$ $H_2COOCNH(\!CH_2\!)_{\overline{6}}NHCOOCH_3$, (iv)

$CH_2=CHCH_2OOCNH(CH_2)_{\overline{6}}NH\overset{O}{\overset{\|}{C}}-CH_2,$
                                                          $|$
                                                          $CH$
                                                          $\|$
                                                          $CH_2$ ⌬—O—$\overset{O}{\overset{\|}{C}}$—NH—$(CH_2)_6$—NH—$\overset{O}{\overset{\|}{C}}$—O—⌬, $CH_2=CHCOO\!+\!CH_2CH_2O\!)_{\overline{2-6}}CH=CH_2$ (v)

(vi) N-imidazolyl-C(O)—m-phenylene—C(O)-N-imidazolyl

-continued

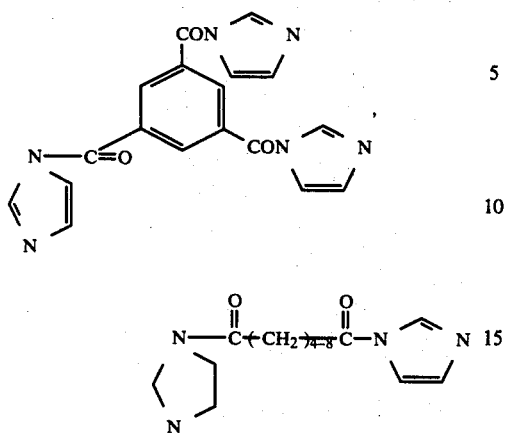

ClCH$_2$COOH, ClCH$_2$COOCH$_3$, ClCH$_2$COOC$_2$H$_5$, (vii)

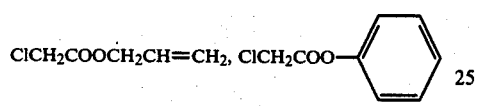

(B) High-molecular-weight polyfunctional compounds containing at least 40 mole% of at least one recurring unit selected from

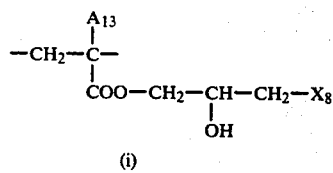 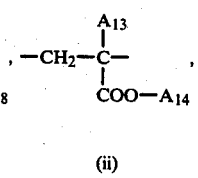

(i) (ii)

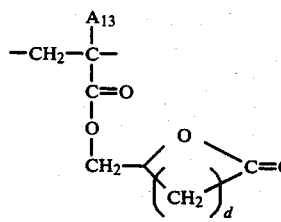 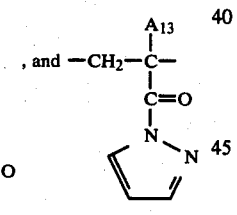

(iii) (iv)

wherein $X_8$ represents a halogen atom, $A_{13}$ is a hydrogen atom or a methyl group, $A_{14}$ represents a hydrogen atom or an alkyl group having 1 to 4 carbon atoms, an allyl group, an aralkyl group having 7 to 10 carbon atoms, or a phenyl group, and d is 1 or 2.

These high-molecular-weight compounds may consist only of at least one of such recurring units, or may contain another recurring unit. Examples of the other recurring unit which may exist are as follows:

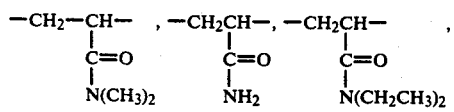

-continued

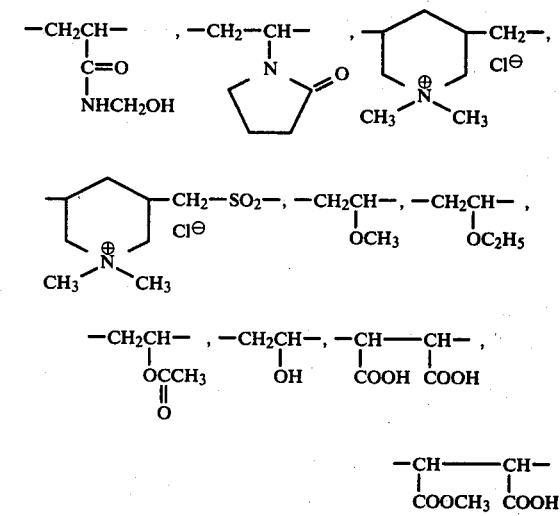

Thus, examples of the polyfunctional high-molecular-weight compounds include those which contain at least 30 mole%, more preferably at least 50 mol%, of at least one of the following recurring units.

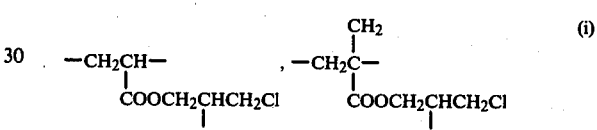 (i)

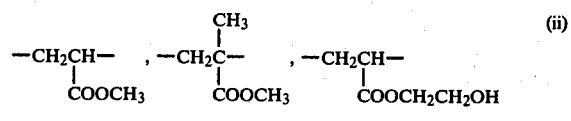 (ii)

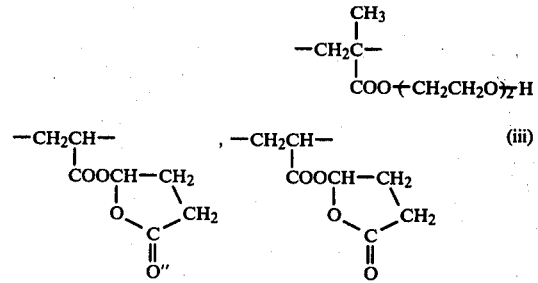 (iii)

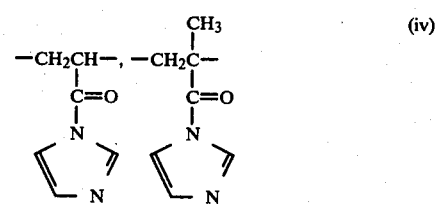 (iv)

Especially preferred high-molecular-weight polyfunctional compounds are those containing the following recurring units.

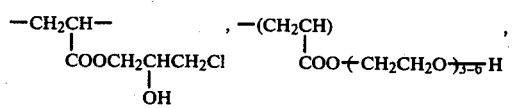

-continued

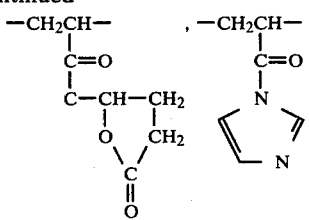

Especially preferred polyfunctional compounds for use in this invention are those which react with the active amino groups in the polyamino polymer to form a so-called hydrophilic hydrogel. If the hydrophobicity of the polyfunctional compound (more strictly, the hydrophobicity of the crosslinked structure formed by the reaction of the functional compound with the active amino groups) is too high, the anchor layer (located between the microporous substrate and the crosslinked active layer formed by interfacial crosslinking) acts as an internal barrier to water permeation, resulting in a reduction in the water flux of the membrane. In this sense, the polyfunctional compound preferably has high hydrophilicity, and aliphatic compounds and alicyclic compounds are preferred to aromatic compounds, the aliphatic compounds being especially preferred.

Examples of polyfunctional compounds which are preferred from this standpoint include ethylene glycol dichlorohydrin, glycerol dichlorohydrin, glycerol trichlorohydrin, sorbitol dichlorohydrin, sorbitol trichlorohydrin, sorbitol tetrachlorohydrin, dimethyl tartrate and diethyl tartrate.

The polyamino polymer and the polyfunctional compound which have been described in detail hereinabove are pre-mixed and used in the form of a solution. The solution does not denote a uniform clear solution alone, and may include an emulsion if a film can be prepared from the emulsion by means to be described.

A solvent system consisting of at least one solvent selected from water and water-miscible organic solvents having a boiling point of not more than 140° C., preferably not more than 120° C., is suitable as the solvent used to form such a solution. The solvent system should be selected such that it does not substantially swell or dissolve the microporous substrate to be described. Examples of preferred solvents are (i) water, (ii) a lower alcohol such as methanol, ethanol and propanol, (iii) a ketone such as acetone, methyl ethyl ketone and diethyl ketone, and (iv) a lower carboxylic acid such as formic acid, acetic acid and propionic acid.

These solvents can be used either alone or as a mixture of two or more. Water, the lower alcohols, and the mixtures thereof are preferred. Water is especially preferred.

The mixing ratio between the polyamino polymer and the polyfunctional compound is not critical, and can generally be changed widely depending upon the types of the polymer and/or polyfunctional compound used. Generally, it can be determined according to the equivalent weight of the active amino groups contained in the polyamine polymer. The polyfunctional compound can be mixed in such a ratio that the ratio of the equivalent weight of the functional groups in the polyfunctional compound to that of the active amino groups in the polyamino polymer is generally 0.05–1:1, preferably 0.1–0.7:1, more preferably 0.2–0.5:1.

The concentration of the polyamino polymer in the solution is not critical, and can be varied widely depending upon the type of the polymer used, and the properties required of the final membrane, etc. Advantageously, it is generally at least 0.5% by weight, preferably 1.0 to 5.0% by weight, especially preferably 1.5 to 3.0% by weight.

The solution so prepared may, if required, include a monofunctional compound containing only one functional group (b) of the type exemplified above per molecule. This can lead to an improvement of the hydrophilicity, flexibility or oxidation resistance of the resulting semipermeable membrane.

Examples of the monofunctional compound that can be used for this purpose include

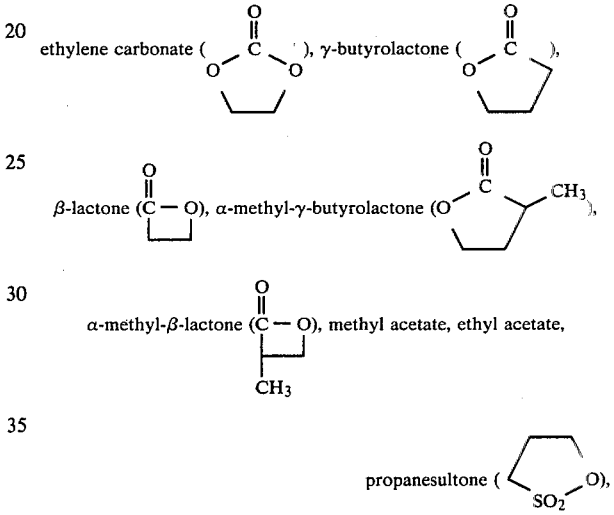

ethyl ortho-formate [CH(OC$_2$H$_5$)$_3$], ethyl methylcarbamate, acetic acid and propionic acid.

The monofunctional compounds may be used singly or as a mixture of two or more. The amount of the monofunctional compound is used in such an amount that the concentration of the functional group is 0.1 to 0.7 equivalent, preferably 0.2 to 0.5 equivalent, per equivalent of the active amino groups in the polyamino polymer. Usually, it is used in a smaller amount than the polyfunctional compound.

As required, an acid acceptor may be added to the solution. When the functional group (a) of the crosslinking agent used in the interfacial crosslinking reaction to be described is, for example, an acid chloride group, the acid acceptor accepts an acid released as a result of the crosslinking reaction, and promotes the reaction. Inorganic and organic basic compounds are used as the acid acceptor. Typical examples are alkaline or alkaline earth metal hydroxides such as sodium hydroxide, potassium hydroxide and calcium hydroxide and alkali or alkaline earth metal carbonates such as sodium bicarbonate, sodium carbonate and calcium carbonate, and amine compounds such as pyridine and piperazine. The amount of the acid acceptor is generally 0.2 to 1.5 moles, preferably 0.5 to 1.0 mole, per mole of this active amino groups in the polyamino polymer.

The solution of the polyamino polymer and the polyfunctional compound so prepared is coated on, or impregnated in, a microporous substrate to be described in a manner known per se, to form thereon a thin layer containing the polymer and the polyfunctional compound. The resulting thin film need not be self-supporting, and may contain the aforesaid additives and solvent.

Substrates that can be used may be any of the types conventionally used in a reverse osmosis process. They include porous glass, sintered metals, ceramics, and organic polymeric materials such as cellulose esters, styrene resins, vinyl butyral resins, polysulfone, chlorinated polyvinyl chloride, etc. described in U.S. Pat. No. 3,676,203. Polysulfone film has been found to be a particularly effective support material for the membranes of the invention, and chlorinated polyvinyl chloride is another very effective support material. Preparation of polysulfone microporous substrate is described in "Office of Saline Water Research and Development Progress Report No. 359, October, 1968".

These substrates preferably have a surface pore size of generally 100 to 1000 Å, but are not limited to these specific sizes. Depending upon the use of the final membrane product, surface pores ranging in size from about 50 Å to about 5000 Å may be acceptable.

The substrate may be of an isotropic structure or an anisotropic structure, desirably of the latter structure. When the membrane constant of the substrate is less than $10^{-4}$ g/cm$^2$·sec·atm, the water permeability of the substrate is too low, and when it is more than 1 g/cm$^2$·sec·atm, the salt rejection tends to be extremely low. Accordingly, preferred membrane constants are 1 to $10^{-4}$ g/cm$^2$·sec·atm, and the best results are obtained with a membrane constant of $10^{-1}$ to $10^{-3}$ g/cm$^2$·sec·atm. The term "membrane constant", as used herein, denotes the amount of pure water which permeates the membrane under a pressure of 2 kg/cm$^2$, and is expressed in g/cm$^2$·sec·atm.

Preferably, the substrate used is reinforced at its back with a woven or non-woven cloth, etc. Examples of the woven or non-woven cloth are those of polyethylene terephthalate, polystyrene, polypropylene, nylon or vinyl chloride resins.

To form the thin layer containing the polyamino polymer and the polyfunctional compound on the microporous substrate, the microporous substrate is treated with the aforesaid solution containing the polyamino polymer and the polyfunctional compound.

The treatment can be performed by coating at least one surface of the substrate with a solution of the base polymer by a suitable method such as solution casting, brush coating, spraying, wick coating or roll coating; or by immersing the substrate in a solution of the base polymer.

The substrate so treated by coating or immersion is then subjected to a drain treatment. The drain treatment can be carried out generally at room temperature for 1 to 30 minutes, preferably 5 to 20 minutes. This results in the formation of a pseudo-thin film layer comprising the polyamino polymer and the polyfunctional compound and having a total thickness of about 500 to about 10,000 Å, preferably about 1,000 to about 4,000 Å, on the surface of the substrate. The pseudo-thin film layer so formed can be air-dried, as required. It is very desirable that the pseudo-thin film layer should contain at least 10% by weight, preferably 20 to 70% by weight of the polyamino polymer and at least 20% by weight, preferably 30 to 80% of the aforesaid solvent remaining therein.

The substrate having the thin layer formed thereon is then subjected to interfacial crosslinking reaction using a crosslinking agent containing at least two functional groups (a) capable of easily reacting with the primary or secondary amino groups or both in the polyamino polymer. As a result, a thinner crosslinked layer (coated outwardly of the permselective layer) is formed on the surface of the pseudo-thin layer.

The functional groups (a) which are present in this highly reactive crosslinking agent are functional groups capable of easily reacting with the primary or secondary amino groups or both in the polyamino polymer, and specifically include carbonyl halide groups (—COHal), sulfonyl halide groups (—SO$_2$Hal), an isocyanate group (—NCO), acid anhydride group

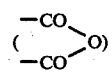

of these, the carbonyl halide groups and sulfonyl halide groups are preferred. In these groups, Hal represents a halogen atom, preferably chlorine and bromine.

The crosslinking agent used in this invention may contain at least two, preferably two or three, functional groups (a) per molecule. Phosgene can also be used as the crosslinking agent containing at least two functional groups (a) since it is equivalent to a compound having two acid halide groups. The two or more functional groups present in one molecule may be the same or different. Generally, the crosslinking agent desirably has a cyclic structure, and may be of any of aromatic, heterocyclic and alicyclic structures. It has been found that aromatic crosslinking agents are especially effective for the objects of this invention.

Aromatic crosslinking agents that can be used advantageously in this invention are mononuclear or polynuclear (binuclear, in particular) compounds which contain at least two, preferably 2 or 3, functional groups bonded to the aromatic nucleus and 6 to 20 carbon atoms, preferably 6 to 15 carbon atoms. Preferably, substituents other than the aforesaid functional groups should not be present on the aromatic ring. The aromatic ring, however, may have 1 or 2 groups which do not substantially affect the crosslinking reaction, such as a lower alkyl group, a lower alkoxy group, a halogen atom, etc.

An especially preferred group of such aromatic crosslinking agents includes compounds of the following formula

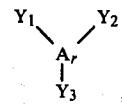

wherein Ar represents a benzene ring, a naphthalene ring, or the ring

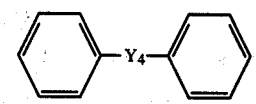

in which Y$_4$ represents —CH$_2$—,

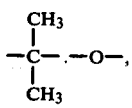

$SO_2$— or —CO—, $Y_1$, $Y_2$ and $Y_3$, independently from each other, represent a carbonyl halide, sulfonyl halide or isocyanate group, or $Y_2$ and $Y_3$ together represent an acid anhydride group, and one of $Y_1$, $Y_2$ and $Y_3$ may be a hydrogen atom. It is especially desirable that $Y_1$, $Y_2$ and $Y_3$ be selected from carbonyl halide and sulfonyl halide groups. Typical examples of the aromatic polyfunctional compounds used as the crosslinking agent are shown below.

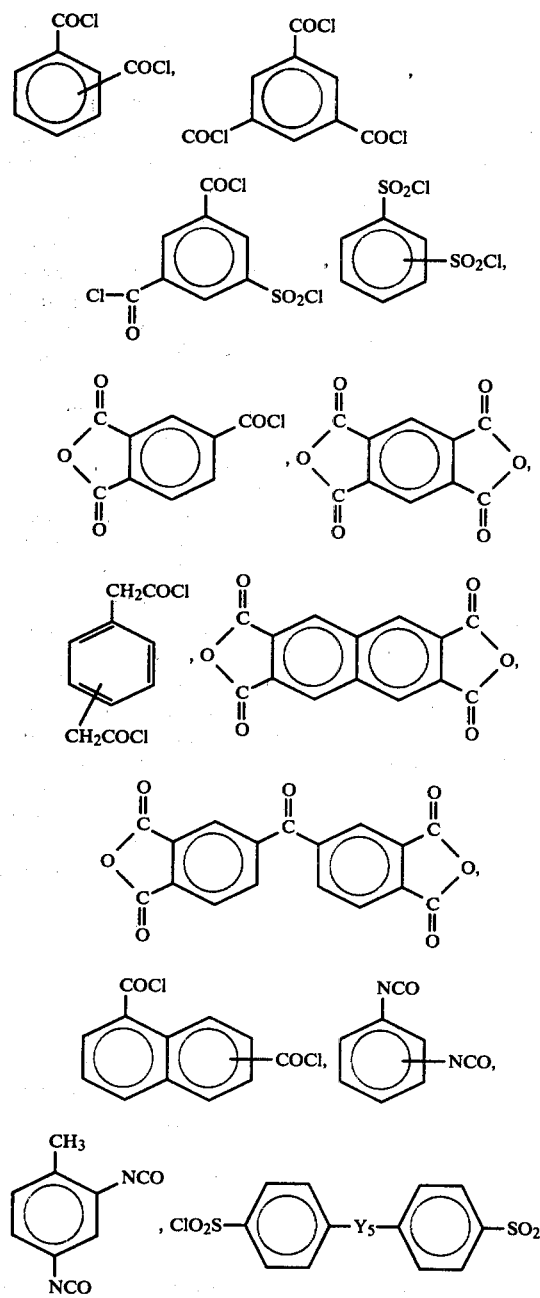

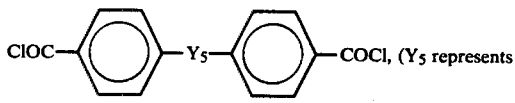

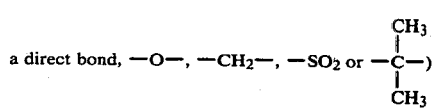

Especially advantageous aromatic polyfunctional compounds used as the crosslinking agent are isophthaloyl chloride, terephthaloyl chloride, trimesoyl chloride and 3-chlorosulfonyl-isophthaloyl chloride.

Preferred heterocyclic polyfunctional compounds that can be used as the crosslinking agents in this invention are 5- or 6-membered heteroaromatic or heteroalicyclic compounds having two or three functional groups bonded to the heterocyclic ring and containing 1 to 2 nitrogen, oxygen or sulfur atoms as heteroatoms. Examples are as follows:

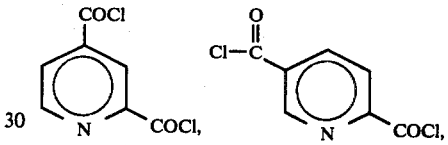

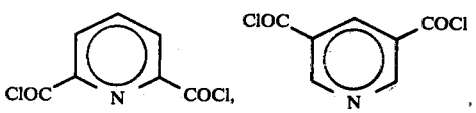

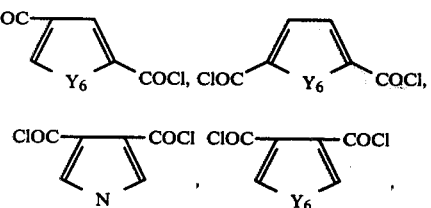

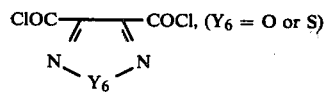

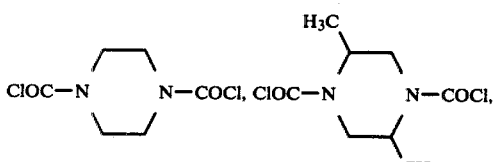

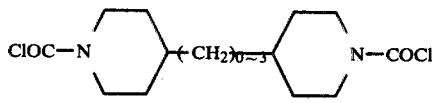

Preferred cyclic polyfunctional compounds that can be used as the crosslinking agent are those having 2 or 3 functional groups bonded to the alicyclic ring and containing 5 to 20, preferably 6 to 15, carbon atoms. Examples are as follows:

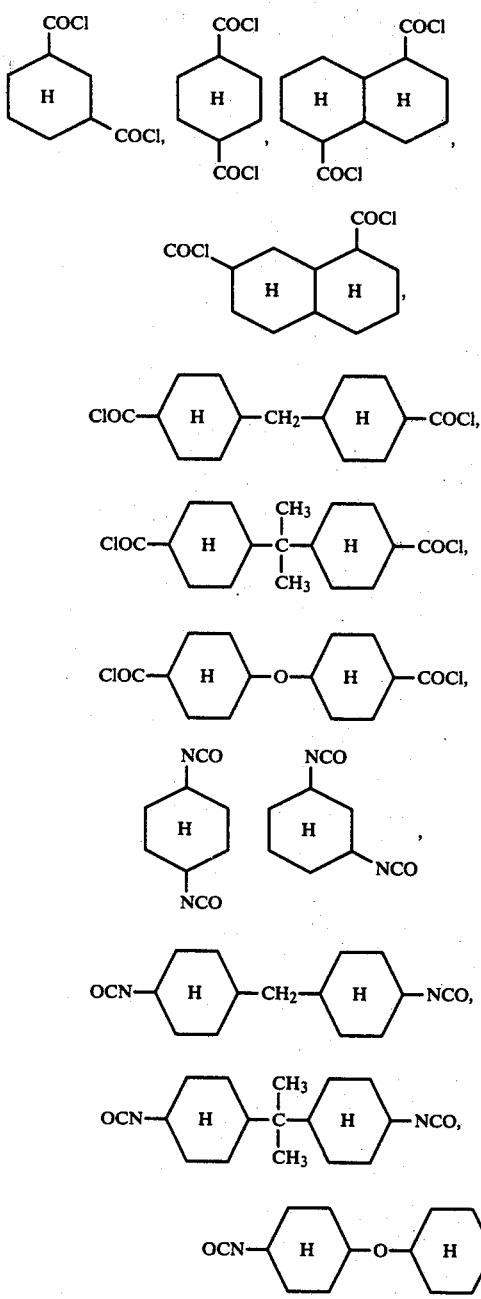

Preferred aliphatic polyfunctional compounds that can be used as the crosslinking agent are those having 2 functional groups and containing 5 to 20, preferably 6 to 15, carbon atoms. Examples are as follows:

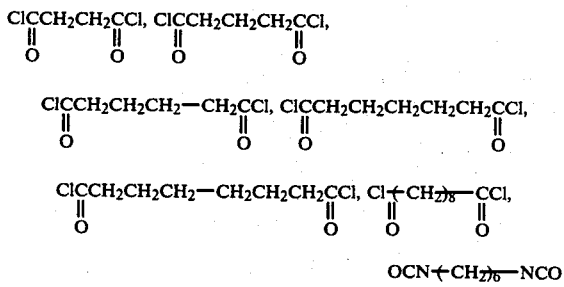

The aromatic heterocyclic or alicyclic polyfunctional compounds can be used either alone or as a mixture of two or more.

In addition to these compounds, cyanuric acid chloride of the following formula

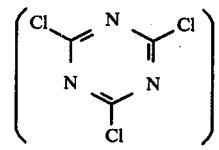

can also be used in this invention as the crosslinking agent.

It has been found that the salt rejecting and/or flux properties of the finely obtained membrane can be improved by using trifunctional compounds rather than difunctional ones when they are used singly, and by using a combination of a difunctional compound and a trifunctional compound when they are used in combination. Thus, especially preferred polyfunctional compounds to be used in the present invention are trifunctional aromatic compounds; and mixtures of difunctional aromatic compounds and trifunctional aromatic compounds. When a mixture of a difunctional compound and a trifunctional compound is used, the mixing ratio between them is not critical. Generally, the weight ratio of the difunctional compound to the trifunctional compound is from 10:1 to 1:3, preferably from 5:1 to 1:1.

The aforesaid crosslinking of the pseudo-thin film can be performed usually by contacting the film with a solution of the crosslinking agent described hereinabove. The solvent used to dissolve the crosslinking agent is a solvent which is not easily miscible with the solution containing the polyamino polymer and the polyfunctional compound and does not substantially dissolve the substrate. Examples of the solvent include hydrocarbons such as n-hexane, n-heptane, n-octane, cyclohexane, n-nonane and n-decane. The optimal concentration of the polyfunctional compound in the solvent may vary considerably depending upon the specific compounds, solvent, substrate, etc., and is best determined experimentally. However, concentrations of about 0.5 to 5.0, preferably about 1.0 to 3.0% by weight, are generally satisfactory.

Conveniently, the crosslinking is accomplished on the interface between the thin film layer and the solution by immersing the thin film layer in the solution of the crosslinking agent. In order to promote this crosslinking reaction, it is possible to include a crosslinking accelerator into the film layer or the solution of the crosslinking agent. This accelerator serves to help the crosslinking agent diffuse into the film layer, and/or to capture hydrogen halide released at the time of crosslinking reaction. Such an accelerator may include, for example, soluble basic compounds and surface-active agents.

Advantageously, suitable soluble basic compounds have a solubility in water or a lower alcohol such as methanol, ethanol or propanol or a mixture thereof of at least 0.1 g, preferably at least 0.2 g, more preferably at least 0.5 g, per 100 g of water, the lower alcohol or a mixture thereof at 25° C. As such compounds, inorganic basic compounds and organic basic compounds having the above solubility can be mentioned. Any inorganic basic compounds having the above-mentioned solubility can be used. The organic basic compounds should desirably have a pKa value of generally 5 to 12, preferably 8 to 12.

Examples of the soluble basic compounds are (1) inorganic bases such as sodium hydroxide, potassium hydroxide, lithium hydroxide, sodium carbonate, lithium carbonate, potassium carbonate, sodium bicarbonate, potassium bicarbonate, lithium bicarbonate, sodium phosphate ($Na_3PO_4$) and potassium phosphate ($K_3PO_4$); and (2) organic bases such as triethylamine, trimethylamine, diazabicyclo[2,2,2]octane, hexamethylenetetramine, ethylenediamine, triethylenetetramine, methylamine, ethylamine, triethanolamine, diethanolamine, pyridine, N,N-dimethylaniline, N-methylpiperidine, and N-methylpyrrolidine.

These basic compounds capture hydrogen halide, which may be formed by the crosslinking reaction to promote the crosslinking reaction, positively participate in the crosslinking reaction itself, and also have the effect of improving the mechanical strength or oxidation resistance of the resulting semipermeable membrane. They are especially suitable as crosslinking accelerators.

The basic compound is used in an amount of generally 0.5 to 2.0 moles, preferably 0.7 to 1.2 moles, per equivalent of the active amino group in the polymer.

The intefacial crosslinking reaction between the surface of the thin film layer and the crosslinking agent can be carried out at a temperature lower than the temperature at which the aforesaid polyfunctional compound having the functional groups (b) reacts, generally at about $-10°$ C. to about $100°$ C., preferably about $5°$ C. to about $40°$ C., more preferably $20°$ C. to $35°$ C., for a period of 10 seconds to 10 minutes, preferably 30 seconds to 5 minutes. This interfacial reaction can be carried out so that it takes place largely on the surface of the thin film layer. It is not necessary to reduce the water content of the internal region of the thin film layer.

If desired, the thin film layer supported on the substrate is then subjected to a draining treatment to drain the excess of the crosslinking agent solution for 10 seconds to 2 minutes, and then is heat-treated at a temperature of $50°$ to $150°$ C., preferably $50°$ to $130°$ C., for about 1 to about 30 minutes, preferably about 5 to about 20 minutes.

As a result of this heat-treatment, crosslinking reaction proceeds between the polyfunctional compound remaining unreacted in the thin film layer and the residual active amino groups in the polyamino polymer to promote gellation of the anchor layer of the thin film layer and improve oxidation resistance by blocking the active amino groups.

Thus, there is obtained a composite membrane consisting of the microporous substrate and formed on its surface, an ultrathin surface layer of a permselective crosslinked polyamino polymer formed by the interfacial crosslinking reaction. Basically, this composite membrane consists of three layers, i.e. the microporous substrate, the crosslinked interlayer (inwardly of the permselective ultrathin surface layer) usually bonded thereto anchoredly and the outer ultrathin semipermeable surface layer thereon. The internal anchor layer has a thickness of usually 0.1 to 10 microns, preferably 0.3 to 5 microns, and the outside ultrathin semipermeable surface layer has a thickness of usually 0.01 to 1 micron, preferably 0.03 to 0.5 micron. The ratio of the thickness of the surface layer to that of the anchor layer may be generally at most 1:5, preferably from 1:5 to 1:15.

In the resulting asymmetrically crosslinked thin film layer, the semipermeable surface layer and the anchor layer are continuously integrated and both are substantially insoluble in water. Under standard conditions, the semipermeable surface layer may have a water flux of generally at least 20 liters/m²·hr, preferably at least 30 liters/m²·hr, and an NaCl rejection of generally at least 80%, preferably at least 90%, and the anchor layer may have a water flux of generally at least 50 liters/m²·hr, preferably at least 100 liters/m²·hr, and an NaCl rejection of generally not more than 70%, preferably lower than 50%.

The term "standard conditions", used herein with regard to the water flux and NaCl rejection, denotes conditions in which the system operating pressure is 600 psi, the operating temperature is 25° C., and the feed solution is a 0.5% by weight aqueous solution of NaCl.

The presumed structure of the interfacially crosslinked portion of the crosslinked thin film layer on the microporous substrate which is formed by the process of this invention may be represented by the following general formula

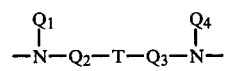

wherein $Q_1$ and $Q_4$ represent a hydrogen atom or an alkyl group having 1 to 5 carbon atoms which may have an oxygen atom, or taken together with the nitrogen atoms to which they are bonded, represent a methylene group ($-CH_2-$) forming the polyamino polymer chain; $Q_2$ and $Q_3$ represent

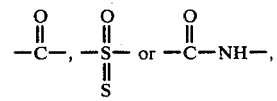

or taken together with T to which they are bonded, represent

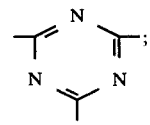

and T represents a $C_2-C_{15}$ aliphatic, aromatic, heterocyclic-aromatic, or alicyclic hydrocarbon group which may contain an oxygen atom, a sulfur atom, a halogen atom or a tertiary nitrogen atom. Some specific examples of this crosslinked structure are shown below.

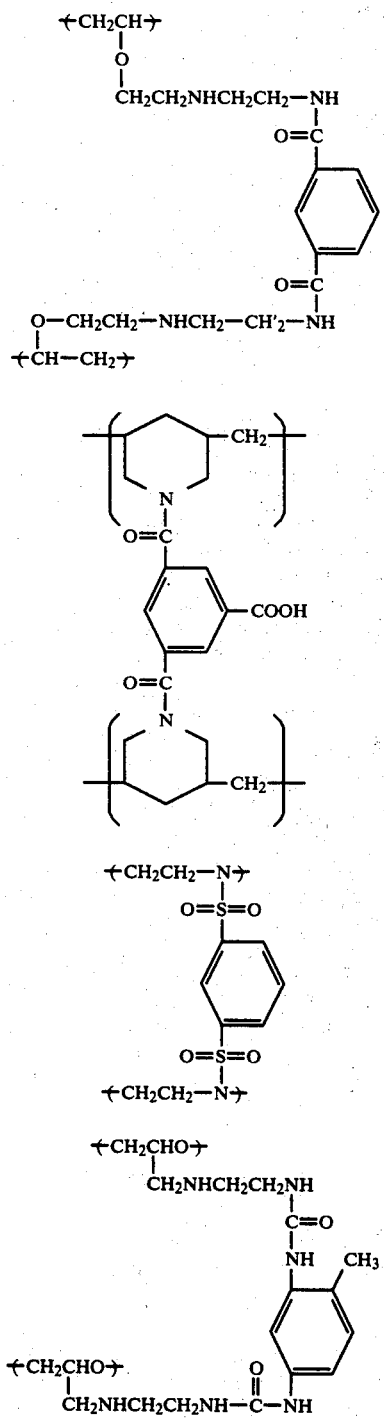

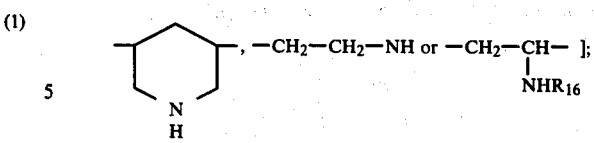

a water-soluble aliphatic diester (e.g., diethyl tartrate) and/or a water-soluble dihalohydrin (e.g., nonaethylene glycol dichlorohydrin) as the polyfunctional compound; and an aromatic polyacid halide or aromatic polyisocyanate [e.g., isophthaloyl chloride (IPC for short), terephthaloyl chloride (TPC for short), trimesoyl chloride (TMC for short), 3-chlorosulfonylisophthaloyl chloride (3-CSIPC for short) and tolylene diisocyanate (TDI for short)] as the crosslinking agent.

(b) A combination of a water-soluble polyamino polymer containing at least 1.0 milliequivalent/g of both primary and secondary amino groups as the active amino groups, the proportion of the secondary amino groups being at least 50 mole%, and having no self-gelling ability at an elevated temperature [for example, the polyamine-modified polyepoxy resins described in (III) hereinabove]; the polyfunctional compound exemplified in (a) above; and the crosslinking agent exemplified in (3) above.

(c) A combination of a water-soluble polyamino polymer containing at least 1.0 milliequivalent/g of secondary amino groups alone as the active amino group and having self-gelling ability at an elevated temperature [for example, the polymers described in (VI) hereinabove, especially the polymers composed of the recurring units of the formulae $$-(CH_2-CH-O)- \text{ and } -(CH_2-CH-O)- \text{ or}$$
$$\phantom{-(CH_2-}CH_2Cl \phantom{\text{ and } -(CH_2-}CH_2NHR_{16}$$

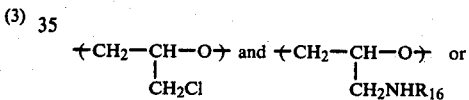

the polyfunctional compound exemplified in (a) above; and the crosslinking agent exemplified in (a) above.

(d) A combination of a water-soluble polyamino polymer containing at least 1.0 milliequivalent/g of both primary and secondary amino groups as the active amino groups, the proportion of the secondary amino groups being at least 50 mole% of the active amino groups, and having self-gelling ability at an elevated temperature; the polyfunctional compound exemplified in (a) above; and the crosslinking agent exemplified in (a) above.

(e) The same combination as (d) except that the polyamino polymer contains only primary amino groups as the active amino groups.

The semipermeable composite membrane provided by this invention comprises a microporous substrate and a permselective thin film layer supported thereon and comprising a polyamino polymer asymmetrically crosslinked in its entirety, the permselective thin film consisting of an ultrathin surface layer having permselectivity and an anchor layer continuous thereto between the microporous substrate and the surface layer for supporting the surface layer and/or bonding it to the micropo- In practising the process of this invention described in detail hereinabove, the following combinations of the polyamino polymer, the polyfunctional compound and the crosslinking agent are especially preferred.

(a) A combination of a water-soluble polyamino polymer containing only secondary amino groups as the active amino groups in an amount of at least 1.0 milliequivalent/g and having no self-gelling ability at an elevated temperature [for example the polymers described in (V) hereinabove, especially the polymers composed of structural units of the formula rous substrate, said surface layer mainly containing a crosslinked structural unit of the formula

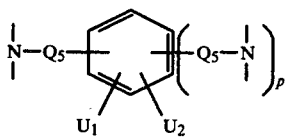

wherein $Q_5$ represents

$-SO_2-$ or $-NHCO-$,
preferably

or $-SO_2$, $U_1$ represents a hydrogen atom or a methyl group, preferably the hydrogen atom, $U_2$ represents a hydrogen atom, a carboxyl group, or a sulfo group, and p is an integer of 1 to 3, especially 1 or 2, and said anchor layer having a structure containing mainly a crosslinked structure of the following formula

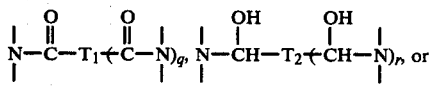

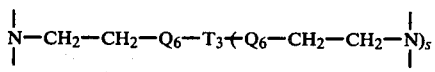

wherein $T_1$, $T_2$ and $T_3$ each represent an aliphatic group having 1 to 10 carbon atoms, preferably 1 to 4 carbon atoms, which may have a nitrogen, oxygen, sulfur or halogen atom as a hetero atom, $Q_6$ represents

or $-SO_2-$, and q, r and s each represent an integer of 1 or 2, particularly 1.

The membrane as produced by the process of this invention may be used as such in applications to be described below. If required, it may be subjected to a post-treatment step to be described.

For example, the membrane can be treated with a solution of a compound containing a metal atom having the ability to form a chelate with a primary amino group, a secondary amino group, a hydroxyl group, a carboxyl group and/or a sulfo group to form a membrane in which such a functional group that may be present in the crosslinked thin film is chelated with the metal atom. This membrane has enhanced flux properties as compared with the untreated membrane. Examples of the metal compound which can be used for this treatment include $BaCl_2$, $MgCl_2$, $HgCl_2$, $CuCl_2$, $CaCl_2$, $FeCl_3$, $AlCl_3$ and $CoCl_3$. Of these, $FeCl_3$, $BaCl_2$, $CaCl_2$ and $MgCl_2$ are preferred.

This treatment can be easily performed by immersing the membrane in an aqueous solution of the metal compound (in a concentration of 1 to 30% by weight) for about 10 to 60 minutes.

The membrane thus obtained can be treated with a liquid polyepoxy compound, acrylonitrile, a lactone such as γ-butyrolactone or β-lactone, or propanesultone to improve its oxidation resistance and salt rejection further. This treatment can be performed by immersing the membrane in a solution (concentration about 0.5 to 3% by weight) of the treating agent at room temperature for 1 to 10 minutes.

Thus, according to this invention, there is provided a semipermeable composite membrane comprising a microporous substrate and a semipermeable thin film of the type described hereinabove formed on one surface of the microporous substrate. In the composite membrane, the thickness of the semipermeable thin film is not strictly set, and it may have a total thickness of at least 100 Å, usually 1,000 to 4,000 Å.

Since the semipermeable composite membrane produced by the process of this invention contains the aforesaid anchor layer which is water-insoluble and has improved mechanical strength, it has excellent hydrolysis resistance, pressure compaction resistance and/or oxidation resistance in addition to high salt rejection and water flux. Furthermore, because of having a crosslinked structure, the membrane of this invention has resistance to attack by organic solvents, and can be advantageously used in a wide range of application including not only the desalination of sea water and brine but also the separation of organic mixed liquids, the treatment of industrial waste waters containing organic matter, and the recovery of valuable matter in the food industry. Thus, the composite membrane provided by this invention has a water flux of generally at least 30 liters/m²·hr, preferably at least 50 liters/m²·hr and an NaCl rejection of a generally at least 80%, preferably at least 90%, under standard conditions, and has such excellent durability that the ratio of the permeation velocity of NaCl in the initial stage to that after use for 200 hours is generally not more than 1.5, preferably not more than 1.0 and the pressure compaction coefficient (m) defined by the following equation is not more than 0.03.

$$m = \frac{1}{\log 200} \log \frac{(WF)_0}{(WF)_{200}}$$

wherein $(MF)_0$ is the water flux of the membrane 1 hour later, and $(WF)_{200}$ is the water flux of the membrane 200 hours later.

The composite membrane obtained by this invention can be used in various modulus, and most preferably, in a spiral module. When the composite membrane of this invention is fabricated into a spiral module, it is preferable to cover the surface of the composite membrane with a film of a water-soluble polymer for protective purposes.

Thus, it is also within the scope of this invention to provide a protective coating on the surface of the composite membrane of the invention. Deposition of the protective coating on the thin film is carried out by coating the barrier film with a water-soluble organic polymer such as polyvinyl alcohol, polyvinyl pyrrolidone, polyacrylamide, polyacrylic acid, polyvinyl methyl ether, and polyvinyl ethyl ether. Polyvinyl alcohol, polyvinyl pyrrolidone and polyvinyl methyl ether are preferred. The polymer is used as a 1–20 wt%, preferably 6-10 wt%, aqueous solution. In a specific embodiment, the dried semipermeable composite membrane is passed through a solution of the water-soluble organic polymer or coating the polymer solution on the surface of this barrier film by known means such as dip coating, spraying, or brush coating to coat the film continuously with the solution of the water-soluble organic polymer; then the water is removed; and to form a final product, the coated semipermeable composite membrane is dried at a temperature of about 50° to 150° C., preferably about 90° to 130° C., for about 5 to 10 minutes.

The membrane having semipermeability provided by this invention is very suitable as a semipermeable membrane for the applications described above because it has superior salt rejection and flux properties, especially flux properties, superior flexibility, high resistance to pressure compaction and high resistances to chemical and biological degradation, especially oxidation resistance and hydrolysis resistance.

The membrane of this invention can be advantageously used as a semipermeable membrane to separate and remove tiny amounts of contaminated molecules dispersed or dissolved in a liquid or gas, and can find extensive application, for example in the desalting of sea water and brackish water, and the treatment of industrial effluents containing organic matter, liquids containing mixtures of organic substances, and waste waters from the food industry, as stated hereinabove.

The membrane of this invention can be used especially advantageously as a reverse osmosis membrane in the desalination of saline or brackish water by reverse osmosis which comprises contacting the saline or brackish water under pressure with the reverse osmosis membrane. This method is known, and a specific procedure described, for example, in Ind. Eng. Chem. Found. 3, 206 (1964) can be used. Thus, the disclosure of this literature reference is incorporated herein by reference.

The following Examples illustrate the present invention more specifically. The reverse osmosis test carried out in these examples followed the procedure described below.

Method for testing reverse osmosis

The composite membrane sample was mounted on a continuously circulating pump-type reverse osmosis device equipped with a flow meter, a thermometer and flow-through cells. Using an aqueous solution of NaCl in a concentration of 5000 ppm as a feed solution, a reverse osmosis test on the membrane sample was performed at 25° C. and 600 psi. The "standard conditions", as used in this application, mean the aforesaid test conditions.

Salt rejection

The salt rejection (%) is a value calculated from the following equation.

$$\text{Salt rejection (\%)} = \left(1 - \frac{\text{NaCl concentration in permeating water}}{\text{NaCl concentration in the test solution}}\right) \times 100$$

The "initial stage performance" means the performance of the composite membrane which has been operated continuously for 1 hour under the standard condition.

The "NaCl permeability" of the membrane is defined by the following equation.

$$\text{NaCl permeability} = \frac{WF}{36000}\left(\frac{100}{R} - 1\right)$$

wherein WF is the water flux of the membrane in liters/m$^2$·hr, and R is the salt rejection (%) of the membrane.

REFERENTIAL EXAMPLE 1

Production of a microporous polysulfone substrate

A Dacron non-woven fabric (basis weight 180 g/m$^2$) was fixed to a glass plate. Then, a solution containing 12.5% by weight of polysulfone, 12.5% by weight of methyl Cellosolve and the remainder being dimethyl formamide was cast onto the fabric in a layer having a thickness of about 200 microns. Immediately, the polysulfone layer was gelled in a water bath kept at room temperature to form a non-woven fabric-reinforced microporous polysulfone membrane.

The resulting microporous polysulfone layer had a thickness of about 40 to about 70 microns and had an anisotropic structure. By observation with an electron microscope, the surface of the microporous layer was found to contain numerous micropores with a size of 50 to 600 Å.

The microporous substrate had a pure water flux (membrane constant) of about 3.0 to 3.7×10$^{-2}$ g/cm$^2$·sec·atm.

REFERENTIAL EXAMPLE 2

Measurement of the concentration of a polyamino polymer in a thin layer

A solution of a polyamino polymer in a suitable concentration was applied to the polysulfone membrane obtained in Referential Example 1, and as required, the solvent was evaporated to form a thin layer containing the polyamino polymer.

The porous polysulfone substrate having the thin layer deposited thereon was put into chloroform to dissolve the polysulfone in chloroform. Thus, an aqueous layer having the polyamino polymer dissolved therein and a chloroform layer having the polysulfone dissolved therein were formed. The aqueous layer was taken out, and after measuring its weight, was evaporated to dryness to obtain the polyamino polymer. The polyamino polymer was weighed, and the concentration of it in the aqueous layer was determined. This is the concentration of the polyamino polymer in the thin layer.

A 0.5-2% by weight aqueous solution of each of the polyamino polymers used in Examples 1 to 40 given hereinbelow was prepared, and a predetermined proportion of the polyfunctional compound was added and dissolved. The resulting solution was applied to the aforesaid polysulfone substrate and drained. It was then air-dried at room temperature for 10 to 20 minutes to form a porous polysulfone substrate having a thin layer of the polymer deposited thereon. Using this substrate, the concentration of the polyamino polymer in the thin layer was measured in accordance with the above procedure. It was within the range of 20 to 60% by weight.

REFERENTIAL EXAMPLE 3

Methods for measuring the degree of water insolubility and self-gellation temperature of the polyamino polymer A predetermined amount of a polyamino polymer was added to 100 parts of water, and they were stirred at room temperature to form a solution. When it is desired to determine the effect of adding the polyfunctional compound, a predetermined amount of it is further added to the solution, and the mixture is stirred at room temperature to form a solution.

The resulting polyamino polymer solution in a predetermined concentration was charged into an autoclave, and the temperature was raised rapidly to a predetermined point under pressure. The solution was maintained at this temperature for 30 minutes to gel the polyamino polymer and then quenched to room temperature.

The polymer solution containing the gelled polymer was filtered to separate the dissolved polyamino polymer. The concentrate obtained was washed with 100 parts of water or alcohol at 70° C. and dried. The weight of the gelled polymer was then measured.

The percentage of the weight of the gelled polymer based on the weight of the polyamino polymer used (when the polyfunctional compound is used, its weight is added) is defined as the degree of water insolubility at the above-mentioned temperature of the polyamino polymer.

The degree of water insolubility of the polyamino polymer was plotted as the function of the heat-treating temperature under the conditions described above, and the temperature at which the degree of water solubility reached 70% was defined as the self-gelling temperature of the polyamino polymer.

EXAMPLE 1

A three-necked flask (500 ml) was charged with 14.6 g of triethylene tetramine and 100 g of distilled water, and with stirring at room temperature in an atmosphere of nitrogen, a mixture of 10 g of bisphenol A diglycidyl ether (Epikote 828, a registered trademark for a product of Shell Chemical Co.) and 7.6 g of glycerol polyglycidyl ether (DENAKOL 314, a registered trademark for a product of Nagase-Ciba Co., Ltd.) was added dropwise from a dropping funnel. The addiion was completed in 1 hour, and the system was heated to 50° C. and stirred for 5 hours to form a uniform clear solution.

The aqueous solution was put into a cellophane tube and dialyzed for one day to remove the unreacted amine and low-molecular-weight by-products. The amine equivalent (primary amino groups+secondary amino groups) of the resulting addition polymer was 22 milliequivalents/g of dried addition polymer.

Diethyl tartrate (0.2 g) was uniformly dissolved in 100 g of a 0.7% by weight aqueous solution of the addition polymer. The polysulfone membrane reinforced with the non-woven fabric obtained in Referential Example 1 was dipped for 5 minutes in the resulting solution and drained for 5 minutes to put it erect vertically to remove the excess of the solution adhering to the membrane. The drained membrane was then dipped for 2 minutes in a 0.5% by weight n-hexane solution of terephthaloyl chloride to perform crosslinking reaction. Subsequently, the membrane was heat-treated for 10 minutes in a hot air dryer at 100° C. to render the interlayer of the composite membrane water-insoluble.

The resulting composite membrane was subjected to a reverse osmosis test by the method described hereinabove (at 25° C. and 42.5 kg/m² using a 0.5% aqueous solution of NaCl as a feed solution). The membrane showed a water flux of 34.5 liters/m²·hr and a salt rejection of 99.34%.

When this membrane was operated continuously, it showed stable performance after a lapse of 1000 hours represented by a water flux of 33.6 liters/m²·hr and a salt rejection of 99.43%. (The reverse osmosis device was washed with a 0.5% aqueous solution of citric acid for 3 hours after a lapse of 300 hours and 700 hours respectively in the above operation.)

COMPARATIVE EXAMPLE 1

Example 1 was repeated except that diethyl tartrate was not used in the production of the composite membrane.

The resulting composite membrane showed initial performance represented by a water flux of 32.4 liters/m²·hr and a salt rejection of 99.31%. But after a lapse of 300 hours, the salt rejection decreased to 99.02% and the water flux was 34.6 liters/m²·hr.

EXAMPLE 2

Example 1 was repeated except that ethylene glycol dichlorohydrin was used in an amount of 0.3 g instead of the diethyl tartrate in Example 1. The composite membrane showed initial performance represented by a water flux of 29.5 liters/m²·hr and a salt rejection of 99.43%. When this membrane was continuously operated for 300 hours, it had a water flux of 27.3 liters/m²·hr and a salt rejection of 99.32%, showing very stable performance.

EXAMPLES 3 TO 8

One gram of the addition polymer synthesized in Example 1 was mixed with 0.3 mole, per equivalent weight of the primary and secondary amino groups combined in the addition polymer, of each of the compounds shown in Table 1 below, and the mixture was heat-treated at 120° C. for 30 minutes by the method shown in Referential Example 3. The amount of water-insoluble gel formed was determined. The mixture before heat-treatment was water-soluble at 25° C. When only the polymer alone was heat-treated at 120° C. for 30 minutes, the gel content was 3.7%.

TABEL I

| Example | Compound | Degree of water solubility* (%) |
|---|---|---|
| 3 | Diethyl tartrate | 43.1 |
| 4 | Ethylene glycol dichlorohydrin bisphenol A dichlorohydrin | 37.5 |
| 5 |  | 56.3 |
| 6 |  | 31.4 |

TABEL I-continued

| Example | Compound | Degree of water solubility* (%) |
|---|---|---|
| 7 | 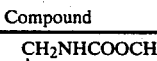 CH₂NHCOOCH₃ / CH₂NHCOOCH₃ | 25.3 |
| 8 | Sorbitol tetrachlorohydrin | 50.5 |

*The weight percent of the water-insoluble gel contained in the mixture of the addition polymer of Example 1 and the above compound after it was heated at 120° C. for 30 minutes.

EXAMPLE 9

In a 100 ml flask, 16.0 g of diallylamine nitrate was dissolved in 50 ml of dimethyl sulfoxide, and 0.5 g of ammonium persulfate was added. With stirring, the mixture was gradually heated to 50° C. The polymerization was performed for 3 hours, and the reaction mixture was left to stand overnight at room temperature. The reaction mixture was then put into a cellophane dialyzing tube and dialyzed to remove the unreacted monomer, the dimethyl sulfoxide solvent, the catalyst, etc. to form poly(diallylamine nitrate) of the following structure [1] in pure form. This polymer had an inherent viscosity, measured at 30° C. in a 1/10 N NaCl solution, of 0.81.

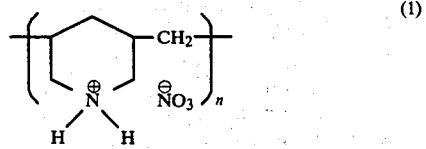 (1)

Two grams of the polymer was put into 50 ml of a 0.5% by weight aqueous solution of sodium hydroxide, and with stirring at room temperature for 3 hours, the mixture was dialyzed in the same way as above to afford an aqueous solution of a polymer of the following structure [2].

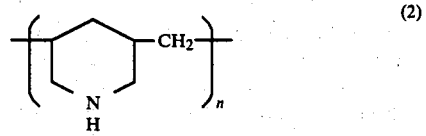 (2)

When a 50% by weight aqueous solution of this polymer was heat-treated at 120° C. for 30 minutes by the method of Referential Example 3, it did not all gel by itself.

A 1% by weight aqueous solution of the polymer was prepared, and 0.4 g of piperazine and a solution of 0.1 g of ethyl monochloroacetate in 10 ml of ethanol were mixed to form a film-forming dope. When this dope was concentrated to 50% by weight and tested for self-gelability in the same way as above, it showed a gel ratio of 63.2%.

The microporous polysulfone membrane obtained in Referential Example 1 was dipped for 5 minutes in the resulting dope, and subsequently drained for 7 minutes. The drained membrane was dipped for 2 minutes in a 0.3% by weight n-hexane solution of isophthaloyl chloride, and then heated at 100° C. for 10 minutes. The resulting composite membrane was subjected to a reverse osmosis test at a pH of 6.0 to 6.5 and 42.5 kg/cm² in the presence of 4 to 5 ppm of active chlorine using a 0.5% aqueous solution of NaCl as a feed solution. The composite membrane showed initial performance represented by a water flux of 45.7 liters/m²·hr and a salt rejection of 94.1%. The membrane was further operated for 200 hours while maintaining the concentration of chlorine at 4 to 5 ppm and the pH at 6 to 6.5. The membrane was found to have a water flux of 39.6 liters/m²·hr and a salt rejection of 96.4%, showing stable performance.

COMPARATIVE EXAMPLE 2

A composite membrane was produced in the same way as in Example 9 except that ethyl monochloroacetate was not used. The resulting composite membrane was subjected to the same reverse osmosis test as in Example 9. It showed initial performances represented by a water flux of 35.0 liters/m²·hr and a salt rejection of 95.1%. When this test was continuously performed for 200 hours, the membrane showed a water flux of 79.3 liters/m²·hr and a salt rejection of 84.3%.

EXAMPLES 10 AND 11

In the same way as in Example 9, the polymer shown in Table II was synthesized, and by using the polymer and diethyl tartrate, a composite membrane was produced. The composite membrane was subjected to a reverse osmosis test in the same way as in Example 9 in the presence of chlorine for 300 hours. The results are shown in Table II.

TABLE II

| | | | | | Reverse osmosis performance | | | |
|---|---|---|---|---|---|---|---|---|
| | | | | | Initial stage | | After 200 hours | |
| Example | Structure of the polymer | Acid acceptor | Polyfunctional Compound | Crosslinking agent | Water flux (liters/m²·hr) | Salt rejection (%) | Water flux (liters/m²·hr) | Salt rejection (%) |
| 10 | 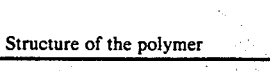 | 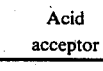 HN NH | Diethyl tartrate | 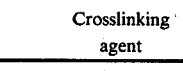 | 64.9 | 91.3 | 57.8 | 93.9 |

TABLE II-continued

| Example | Structure of the polymer | Acid acceptor | Polyfunctional Compound | Crosslinking agent | Reverse osmosis performance | | | |
|---|---|---|---|---|---|---|---|---|
| | | | | | Initial stage | | After 200 hours | |
| | | | | | Water flux (liters/m²·hr) | Salt rejection (%) | Water flux (liters/m²·hr) | Salt rejection (%) |
| 11 | " | " | Diethyl tartrate | 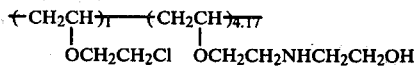 | 93.4 | 84.0 | 87.1 | 92.8 |

EXAMPLE 12

Ten grams of polyepichlorohydrin having a molecular weight of about 3,000 was dissolved in 100 ml of N-methylpyrrolidone, and 20 g of aniline was added. The mixture was heated at 120° to 130° C. for 3 hours in an atmosphere of nitrogen.

The reaction mixture was put into a cellophane tube and dialyzed to remove N-methylpyrrolidone and the unreacted aniline to afford an aqueous suspension of partially aniline-modified polyepichlorohydrin having the following structural formula

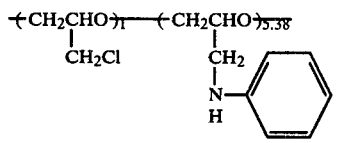

One gram of the polymer, 0.3 g of sebasic dimidazolide

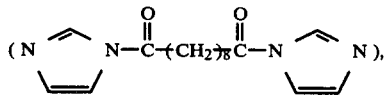

0.1 g of sodium dodecylsulfate and 10 ml of ethanol were added to 100 g of distilled water, and they were vigorously stirred by a homogenizer to afford a white emulsion.

Using the emulsion, a composite membrane was produced in the same way as in Example 1. The membrane was subjected to the same chlorine-resistant reverse osmosis test as in Example 9. The composite membrane was found to have initial performance represented by a water flux of 27.7 liters/m²·hr and a salt rejection of 98.1%. When this test was continued for 200 hours, the composite membrane still showed a water flux of 25.9 liters/m²·hr, and a salt rejection of 98.3%, indicating stable performance.

COMPARATIVE EXAMPLE 3

A composite membrane was produced in the same way as in Example 12 except that diimidosebacamide was not used. The resulting membrane was subjected to the same chlorine-resistant reverse osmosis test. It was found that the composite membrane had initial performance represented by a water flux of 26.2 liters/m²·hr and a salt rejection of 96.9%. But 50 hours later, the membrane had a water flux of 43.1 liters/m²·hr and a salt rejection of 90.4%, showing degraded performance.

EXAMPLE 13

A polymer of the following structure was produced in the same way as in Example 12 except that poly(2-chloroethylvinyl ether) having a molecular weight of about 5,000 was used instead of the polyepichlorohydrin, and monoethanolamine was used instead of the aniline.

$$\text{+CH}_2\text{CH}\text{+}_{n'}\text{---+CH}_2\text{CH}\text{+}_{n.17}$$
$$\quad\quad|\quad\quad\quad\quad\quad\quad|$$
$$\text{OCH}_2\text{CH}_2\text{Cl}\quad\text{OCH}_2\text{CH}_2\text{NHCH}_2\text{CH}_2\text{OH}$$

One gram of the polymer, 0.3 g of diethyl tartrate, 0.1 g of sodium dodecylsulfate and 0.4 g of sodium bicarbonate were added to 100 g of distilled water, and they were vigorously stirred by a homogenizer to afford a white emulsion.

A composite membrane was produced in the same way as in Example 1 using the resulting emulsion. When the composite membrane was subjected to the same chlorine-resistant reverse osmosis test as in Example 9, the composite showed initial performance represented by a water flux of 25.8 liters/m²·hr and a salt rejection of 94.9%. One hundred hours later, the membrane still had a water flux of 22.1 liters/m²·hr and a salt rejection of 95.3%, showing stable performance.

COMPARATIVE EXAMPLE 4

A composite membrane was produced in the same way as in Example 13 except that diethyl tartrate was not used. The composite membrane was subjected to the same reverse osmosis test as in Example 13. The membrane showed initial performance represented by a water flux of 27.1 liter/m²·hr and a salt rejection of 93.4%. After operating for 30 hours, the membrane showed a degrading tendency and had a water flux of 38.7 liters/m²·hr and a salt rejection of 87.4%.

EXAMPLE 14

Chloromethylstyrene (10 g) was dissolved in 50 ml of benzene, and 0.3 g of azobisisobutyronitrile was added. The polymerization was performed for 8 hours in a nitrogen atmosphere at 70° C. to afford poly(p-chloromethylstyrene) having a molecular weight of about 6,500.

Ethylamine (10 g) was added to a solution of 2 g of this polymer in 50 ml of N-methylpyrrolidone, and the mixture was stirred at 50° C. for 5 hours in an atmosphere of nitrogen. The reaction mixture was dialyzed to form a polymer of the following structure.

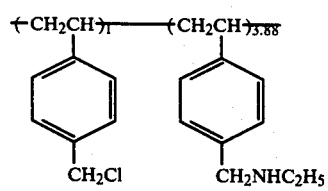

A composite membrane was produced in the same way as in Example 13 using the resulting polymer. The composite membrane was subjected to the same chlorine-resistant reverse osmosis test as in Example 9. It was found that the membrane showed initial performance represented by a water flux of 22.3 liters/m²·hr and a salt rejection of 95.4%. One hundred hours later, the composite membrane still had a water flux of 20.7 liters/m²·hr and a salt rejection of 96.2%, showing stable performance.

COMPARATIVE EXAMPLE 5

A composite membrane was produced in the same was as in Example 14 except that diethyl tartrate was not used, and the resulting membrane was subjected to the same reverse osmosis test. It was found that the membrane had a water flux of 25.7 liters/m²·hr and a salt rejection of 94.1% in the initial stage and after a lapse of 70 hours, it had a water flux of 51.3 liters/m²·hr and a salt rejection of 85.9%, showing degraded performance.

EXAMPLE 15

Five grams of polymethyl acrylate (molecular weight about 100,000) was dissolved in 95 g of N-methylpyrrolidone, and 60 g of diethylenetriamine was added. The mixture was heated at 120° C. for 10 hours.

The mixture was put into 1 liter of tetrahydrofuran to precipitate the reaction product which was washed several times with tetrahydrofuran to form a polyamino polymer of the following structure.

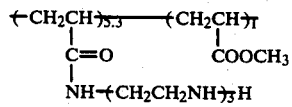

The polymer had an intrinsic viscosity, measured in 1/10 N aqueous NaCl, of 0.95. When a 50% solution of this polymer was heat-treated at 120° C. for 30 minutes in the same way as in Example 3, its self-gelling ratio was 43%.

A solution of 1 g of the resulting polymer in 50 ml of distilled water was mixed with a solution of 0.2 g of isophthaloyl diimidazolide

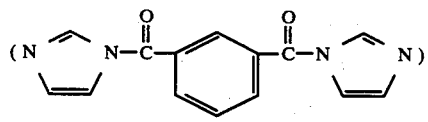

in 10 ml of ethanol to form a film-forming dope. When this dope was concentrated to 50% by weight, and subjected to the same self-gellation test as above, the self-gellation ratio of the polymer was 78.3%.

A composite membrane was produced in the same way as in Example 1 using the resulting film-forming dope. In the reverse osmosis test, this composite membrane showed a water flux of 72.1 liters/m²·hr and a salt rejection of 91.3% in the initial stage, and after continuously operating it for 200 hours, it still had a water flux of 67.3 liters/m²·hr and a salt rejection of 95.8%, showing stable performance.

COMPARATIVE EXAMPLE 6

A composite membrane was produced in the same way as in Example 15 except that isophthaloyl diimidazolide was not used. The resulting membrane showed a water flux of 80.3 liters/m²·hr and a salt rejection of 90.2%. After a lapse of 200 hours, the membrane had water flux of 98.4 liters/m²·hr and a salt rejection of 87.4%, showing a degrading tendency in performance.

EXAMPLE 16

A solution of 5 g of polyepichlorohydrin having a number average molecular weight of 20,000 in 100 ml of N-methylpyrrolidone was added to 70 g of ethylenediamine and reacted at 100° C. for 20 hours. The reaction mixture was then poured into 1 liter of tetrahydrofuran, and washed several times with tetrahydrofuran to afford a polyamino polymer having the following structure and an intrinsic viscosity, determined in a 1/10 N aqueous NaCl, of 0.54.

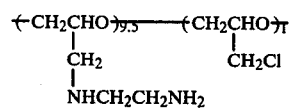

When a 50% by weight aqueous solution of this polymer was heat-treated by the method of Referential Example 3, it showed a self-gelling ratio of 45.1%. A solution of 2 g of the resulting polymer in 100 g of distilled water was mixed with a solution of 0.2 g of poly(3-chloro-2-hydroxypropyl acrylate) having an intrinsic viscosity, determined in N-methylpyrrolidone, of 0.38 and the following structural formula

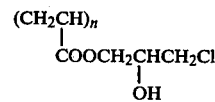

in 10 ml of dioxane to form a film-forming dope.

When this dope was concentrated to 50% by weight and heat-treated at 120° C. for 30 minutes, the polymer showed a self-gelling ratio of 79.8%.

A composite membrane was obtained in the same way as in Example 1 using the film-forming dope. The composite membrane showed a water flux of 64.9 liters/m²·hr and a salt rejection of 98.4% in the initial stage. When this reverse osmosis test was continued for 200 hours, the composite membrane still had a water flux of 60.1 liters/m²·hr and a salt rejection of 98.9%, showing very stable performance.

COMPARATIVE EXAMPLE 7

A composite membrane was produced in the same way as in Example 16 exceot that poly(3-chloro-2-hydroxypropyl acrylate) was not used. This composite membrane had a water flux of 58.2 liters/m²·hr and a salt rejection of 98.7% in the initial state, and after a lapse of 200 hours, it had a water flux of 53.7 liters/m²·hr and a salt rejection of 97.6% showing a degrading tendency in performance.

COMPARATIVE EXAMPLE 8

A composite membrane was produced in the same way as in Comparative Example 7 except that the heat-treatment temperature for the production of the composite membrane was changed to 140° C. This composite membrane showed a water flux of 13.7 liters/m²·hr and a salt rejection of 97.7%, showing low performance in reverse osmosis.

posite membranes in the reverse osmosis test in the initial stage and after a lapse of 200 hours are shown in Table III.

TABLE III

| | | Polyfunctional compound | | Crosslinking agent | | Self-gelling ratio (at 120° C. for 30 min.) | Reverse osmosis performance | | | |
|---|---|---|---|---|---|---|---|---|---|---|
| | | | | | | | Initial stage | | After 200 hours | |
| Example | Polyamino polymer | Name | Concentration (wt. %) | Name | Concentration (wt. %) | | Water flux (liters/ m²/hr) | Salt rejection (%) | Water flux (liters/ m²/hr) | Salt rejection (%) |
| 17 | PEI (0.5 wt. %) | Diethyl tartrate | 0.1 | Trimesoyl trichloride | 0.2 | 84.5 | 52.5 | 96.9 | 49.1 | 97.3 |
| 18 | PEI (0.5 wt. %) | Diethylene glycol di-chlorohydrin | 0.2 | Trimesoyl trichloride | " | 88.3 | 38.6 | 98.1 | 35.2 | 98.0 |
| 19 | PEI (0.5 wt. %) | Chloroacetic acid | 0.1 | Trimesoyl trichloride | " | 61.1 | 71.4 | 92.2 | 66.0 | 95.4 |
| 20 | PEI (0.5 wt. %) | Ethylene glycol diacrylate | 0.2 | Trimesoyl trichloride | " | 53.2 | 63.0 | 94.5 | 58.7 | 96.2 |
| 21 | PEI (0.5 wt. %) | Sorbitol tetra-chlorohydrin | 0.05 | Trimesoyl trichloride | " | 79.2 | 32.9 | 98.8 | 30.4 | 99.2 |
| 22 | PEI (0.5 wt. %) | Nonaethylene glycol di-chlorohydrin | 0.2 | Trimesoyl trichloride | " | 71.6 | 45.7 | 98.0 | 41.1 | 98.7 |
| 23 | PEI (0.5 wt. %) | Methyl chloroacetate | " | Trimesoyl trichloride | " | 69.0 | 50.8 | 91.4 | 45.3 | 94.3 |
| 24 | PEI (0.5 wt. %) | Diethylene glycol di-acrylate | 0.3 | Trimesoyl trichloride | " | 55.5 | 79.1 | 84.7 | 70.9 | 89.4 |
| 25 | PEI (0.5 wt. %) | Hexamethylene diethyl carbamate | 0.1 | Trimesoyl trichloride | " | 49.9 | 33.2 | 96.3 | 30.6 | 97.1 |
| 26 | PEI (0.5 wt. %) | 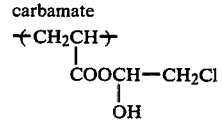 (I.V = 0.51) | 0.5 | Trimesoyl trichloride | " | 83.8 | 40.5 | 97.9 | 36.3 | 98.6 |
| 27 | PEI (0.5 wt. %) | 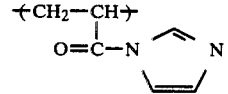 (I.V = 0.83) | 0.4 | Trimesoyl trichloride | " | 91.7 | 44.6 | 98.1 | 46.4 | 98.2 |
| Comparative Example 8 | PEI (0.5 wt. %) | — | — | Trimesoyl trichloride | " | 2.5 | 37.0 | 98.6 | 51.8 | 96.7 |

EXAMPLES 17 TO 27

Polyethyleneimine having a number average molecular weight of 10,000 (a product of Nippon Shokubai Kagaku Kogyo Co., Ltd.) was dissolved in distilled water to form a 0.5% aqueous solution of the polymer.

Each of the polyfunctional compounds shown in Table III was added to the resulting solution, and a composite membrane was produced in the same way as in Example 1. The performances of the resulting com-

EXAMPLES 28 TO 40

The self-gelling temperatures (for its definition and the method for its measurement, see Referential Example 3) of the polyamino polymers used in Examples 1 to 27 and mixtures of these polyamino polymers with the polyfunctional compounds shown in Table IV were measured.

A mixed solution of each of the polyamino polymers and each of the polyfunctional compounds was applied to the microporous polysulfone substrate obtained in Referential Example 1 and drained to form a thin layer containing about 50% by weight of the mixture of the polyamino polymer and the polyfunctional compound, and then without performing interfacial crosslinking, heat-treated for 30 minutes at the self-gelling temperature.

This test gave information about the barrier property and durability of the anchor layer of this invention.

The results are shown in Table IV.

The heat-treatment of the composite membrane not containing the polyfunctional compound was performed at a self-gelling temperature range corresponding to that for the composite membrane containing the polyfunctional compound.

sulfonyl halide, isocyanate and acid anhydride groups; the improvement wherein (1) said polymeric material contains dispersed therein a polyfunctional aliphatic compound having at least two functional groups (b) which are selected from the group consisting of $-CH(OH)CH_2X_1$, $-COOA_1$, $-NHCOOA_2$,

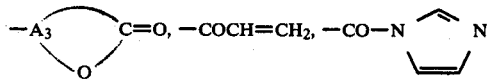

TABLE IV

| | | | | Reverse osmosis performance | | | |
|---|---|---|---|---|---|---|---|
| | | | | Initial stage | | After 200 hours | |
| Example | Polyamino polymer | Polyfunctional compound | Self-gelling temperature (°C.) | Water flux (liters/ $m^2 \cdot hr$) | Salt rejection (%) | Water flux (liters/ $m^2 \cdot hr$) | Salt rejection (%) |
| 28 | Polyamino polymer of Ex. 1 | Diethyl tartrate None | 140-145 >170 | 141.3 170.0 | 53.5 52.0 | 136.3 210.1 | 52.1 34.5 |
| 29 | Polyamino polymer of Ex. 1 | Ethyleneglycol dichlorohydrin | 150-155 | 97.2 | 49.7 | 87.3 | 51.5 |
| 30 | Polyamino polymer of Ex. 9 | Monochloroacetate None | 120-130 >160 | 200.8 288.4 | 45.1 16.4 | 179.5 312.1 | 44.3 12.7 |
| 31 | Polyamino polymer of Ex. 10 | Diethyl tartrate None | 100-110 >150 | 179.6 218.5 | 25.3 17.2 | 154.4 273.7 | 27.0 15.2 |
| 32 | Polyamino polymer of Ex. 12 | Diimidazosebacamide None | 80-90 130-140 | 84.7 98.9 | 59.8 31.1 | 77.6 121.0 | 63.1 29.7 |
| 33 | Polyamino polymer of Ex. 13 | Diethyl tartrate None | 90-100 120-130 | 132.4 177.8 | 67.9 55.0 | 98.8 164.3 | 71.3 31.2 |
| 34 | Polyamino polymer of Ex. 14 | Diethyl tartrate None | 120-130 >150 | 75.1 93.4 | 68.2 60.7 | 53.9 115.0 | 70.8 49.6 |
| 35 | Polyamino polymer of Ex. 15 | Imidazophthalamide None | 110-120 140-150 | 63.8 219.5 | 52.7 31.2 | 52.3 211.4 | 53.5 27.0 |
| 36 | Polyamino polymer of Ex. 16 | Poly(3-chloro-2-hydroxypropylacrylate) None | 110-120 140-150 | 92.0 125.3 | 74.3 60.7 | 77.9 100.7 | 75.1 48.9 |
| 37 | Polyamino polymer of Ex. 17 | Diethyl tartrate None | 100-110 >150 | 70.8 83.2 | 65.5 61.4 | 62.1 70.5 | 70.7 48.3 |
| 38 | Polyamino polymer of Ex. 20 | Ethyleneglycol diacrylate | 120-130 | 65.9 | 70.3 | 50.8 | 68.9 |
| 39 | Polyamino polymer of Ex. 25 | Hexamethylene diethylcarbamate | 130-140 | 51.2 | 58.9 | 53.3 | 63.5 |
| 40 | Polyamino polymer of Ex. 27 | $-(CH_2-CH)-$ $O=C-N\frown N$ (I.V. = 0.83) | 80-90 | 74.4 | 72.1 | 68.7 | 75.0 |

What we claim is:

1. In a process for producing a semipermeable composite membrane which comprises forming on a microporous substrate a thin layer of polymeric material comprising a polyamino polymer containing at least 1 milliequivalent, per gram of the polymer in the dry state, of active amino groups selected from primary amino groups and secondary amino groups, and thereafter interfacially crosslinking a surface portion of said thin layer with a crosslinking agent comprising a cyclic compound having at least two functional groups (a) selected from the group consisting of carbonyl halide, and active halomethyl groups, in which $X_1$ and $X_2$ each represent a halogen atom, $A_1$ and $A_2$ each represent a hydrogen atom or an organic radical capable of being split off together with the oxygen atom to which it is bonded, and $A_3$ represents a trivalent or tetravalent saturated aliphatic groups having 2 to 5 carbon atoms, and are substantially incapable of reacting with the primary or secondary amino groups in said polymer at a temperature at which the interfacial crosslinking is carried out, but capable of reacting easily with either the primary or secondary amino groups or both in said polymer at a temperature at least 30° C. higher than said crosslinking temperature, and (2) the interfacially crosslinked thin layer is heated to a temperature at which said polyfunctional compound reacts with the primary or secondary amino groups or both in said polymer.

2. The process of claim 1 wherein said functional groups (b) do not substantially react with either the primary or secondary amino groups of said polymer at a temperature of not more than 20° C., but react easily with either the primary or secondary amino groups or both in said polymer at a temperature of at least 50° C. but below the self-gelling temperature of said polymer.

3. The process of claim 1 wherein said functional groups (b) do not substantially react with either the primary or secondary amino groups of said polymer at a temperature of not more than 30° C., but reacts easily with either the primary or secondary amino groups or both in said polymer at a temperature of at least 70° C. but below the self-gelling temperature of said polymer.

4. The process of claim 1 wherein the polyfunctional compound is a low-molecular-weight or high-molecular-weight polyfunctional compound which dissolves in a solvent selected from water and water-miscible organic solvents having a boiling point of not more than 140° C. to an extent of at least 0.1 g/100 ml of the solvent at 20° C.

5. The process of claim 1 wherein the polyfunctional compound is an organic compound containing 2 to 4 functional groups (b) per molecule and having a molecular weight of 90 to 500.

6. The process of claim 1 wherein the polyfunctional compound is a high-molecular-weight organic compound containing said functional groups (b) in an amount of 2.0 to 15.0 milliequivalents per gram of the compound and having a number average molecular weight of 1,000 to 100,000.

7. The process of claim 6 wherein the high-molecular-weight organic compound is a vinyl polymer.

8. The process of claim 1 wherein the polyfunctional compound is a compound selected from compounds of the following formulae

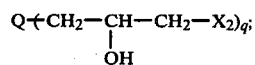  (i)

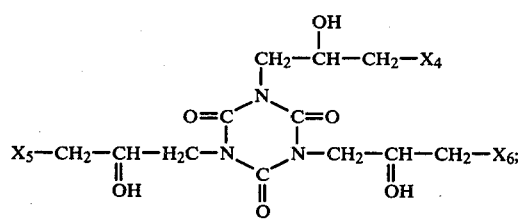  (ii)

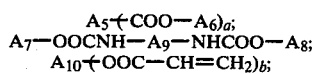  (iii)
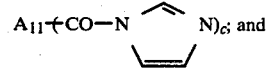  (iv)
   (v)
  (vi)

$X_7-CH_2-COO-A_{12}$  (vii)

in which formulae Q represents a direct bond, an ether linkage, or an alkyl group having 2 to 20 carbon atoms which may contain an oxygen or halogen atom, q is an integer of from 2 to 6, each of $X_2$, $X_3$, $X_4$, $X_5$, $X_6$ and $X_7$ represents a halogen atom, each of $A_5$, $A_{10}$ and $A_{11}$ represents a hydroxyl group, an aliphatic groups containing 1 to 12 carbon atoms and having a valence of a, b or c which may contain an oxygen or halogen atom, an aromatic group containing 6 to 10 carbon atoms and having a valence of a, b or c, or an alicyclic groups containing 5 or 6 carbon atoms and having a valence of a, b or c, each of $A_6$, $A_7$, $A_8$ and $A_{12}$ represents an alkyl group having 1 to 4 carbon atoms, an allyl group, a phenyl group or an aralkyl group having 7 to 10 carbon atoms, $A_9$ represents an alkylene group having 2 to 10 carbon atoms, or an arylene group which may be substituted by a halogen atom or an alkyl group having 1 to 6 carbon atoms, and a, b and c each represent an integer of 2 to 4.

9. The process of claim 1 wherein the polyfunctional compound is a high-molecular-weight compound containing at least 40 mole% of at least one recurring unit selected from the group consisting of

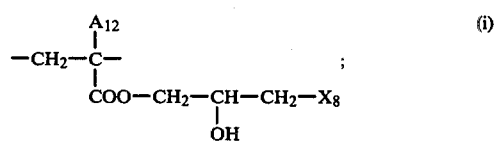  (i)

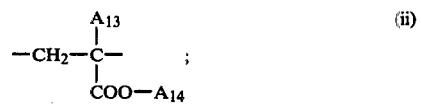  (ii)

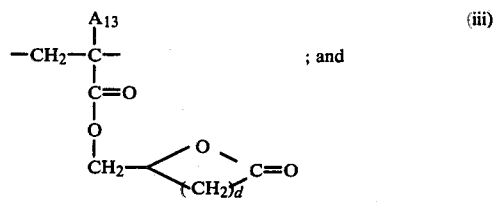  ; and  (iii)

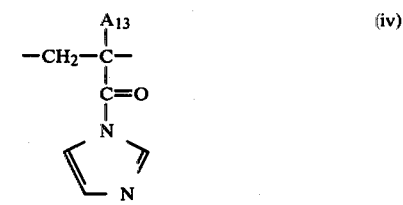  (iv)

in which formulae $A_8$ represents a halogen atom, $A_{13}$ represents a hydrogen atom or a methyl group, $A_{14}$ represents a hydrogen atom or an alkyl group having 1 to 4 carbon atoms, an allyl group, an aralkyl group having 7 to 10 carbon atoms, or a phenyl group, and d is 1 or 2.

10. The process of claim 1 wherein the polyfunctional compound is ethylene glycol dichlorohydrin, glecerol dichlorohydrin, glycerol trichlorohydrin, sorbitol dichlorohydrin, sorbitol trichlorohydrin, sorbitol tetrachlorohydrin, dimethyl tartrate or diethyl tartrate.

11. The process of claim 1 wherein said thin layer contains 0.05 to 1 equivalent, per equivalent of the active amino groups in said polyamino polymer, of said polyfunctional compound.

12. The process of claim 1 wherein said thin layer contains 0.1 to 0.7 equivalent, per equivalent of the active amino groups in the polyamino polymer, of said polyfunctional compound.

13. The process of claim 1 wherein said functional groups (a) react easily with the primary or secondary amino groups or both in said polymer at a temperature of not more than 30° C.

14. The process of claim 1 wherein said functional groups (a) react easily with the primary or secondary amino groups or both in said polymer at a temperature of not more than 20° C.

15. The process of claim 1 wherein said functional groups (a) are carbonyl halide or sulfonyl halide groups.

16. The process of claim 15 wherein said cyclic compound is an aromatic compound.

17. The process of claim 1 wherein said crosslinking agent is selected from the group consisting of isophthaloyl chloride, terephthaloyl chloride, trimesoyl trichloride and 3-chlorolsulfonylisophthaloyl chloride.

18. The process of claim 1 wherein said polyamino polymer contains 5.0 to 23.0 milliequivalents, per gram of the polymer in the dry state, of said active amino groups.

19. The process of claim 1 wherein said polyamino compound has a number average molecular weight of 1,000 to 100,000.

20. The process of claim 1 wherein said polyamino polymer has an intrinsic viscosity, determined at 30° C. for a 1/10 N aqueous solution of sodium chloride, of 0.1 to 2.0 dl/g.

21. The process of claim 1 wherein said polyamino polymer dissolves in at least one solvent selected from the group consisting of water and water-miscible organic solvents having a boiling point of not more than 140° C. to an extent of at least 0.2 g/100 mg of the solvent at 20° C.

22. The process of claim 1 wherein said polyamino polymer is a polyaddition product between a polyepoxy compound and a polyamino compound having at least two active amino groups.

23. The process of claim 1 wherein the polyamino polymer is polyethyleneimine, a polyamine-modified polyepichlorohydrin, or a polyamine-modified poly(2-chloroethyl vinyl ether).

24. The process of claim 1 wherein said polyamino polymer is a polymer containing at least 30 mole% of a recurring unit of the following formula

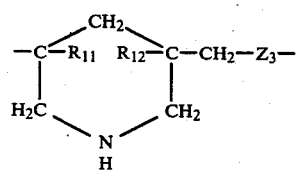

wherein $R_{11}$ and $R_{12}$ each represent a hydrogen atom or a methyl group and $Z_3$ represents a direct bond or $-SO_2-$.

25. The process of claim 1 wherein the polyamino polymer is a polymer consisting mainly of two recurring units of the formulae

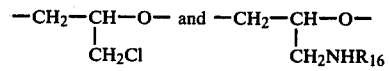

wherein $R_{16}$ represent an alkyl group having 1 to 4 carbon atoms,
or of two recurring units of the formulae

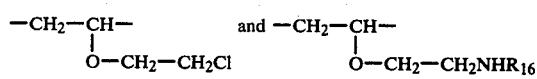

wherein $R_{16}$ is as defined above.

26. The process of claim 1 wherein the polyamino polymer is a polymer which does not gel by itself at a temperature of not more than 60° C.

27. The process of claim 1 wherein said thin layer contains at least 10% by weight of the polyamino polymer.

28. The process of claim 1 wherein said thin layer is formed by applying a solution containing the polyamino polymer and the polyfunctional compound to the microporous substrate, and if desired, partially evaporating the solvent.

29. The process of claim 1 wherein the interfacial crosslinking is carried out at a temperature of about 5° C. to about 40° C.

30. The process of claim 1 wherein the interfacially crosslinked layer is heated to about 50° C. to about 130° C.

31. A semipermeable composite membrane produced by any one of claims 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30.

32. The membrane of claim 1 which has a water flux of at least 30 liters/m²·hr and a NaCl rejection of at least 90% under standard conditions, the ratio of the permeation velocity of NaCl in the initial stage to that after continuous use for 200 hours being not more than 1.50, and which also has a pressure compaction coefficient expressed by the following equation of not more than 0.03:

$$\frac{1}{\log 200} \log \frac{(WF)_0}{(WF)_{200}}$$

wherein $(WF)_0$ is the water flux of the membrane in the initial stage (after 1 hour), and $(WF)_{200}$ is the water flux of the membrane after 200 hours.

* * * * *

UNITED STATES PATENT AND TRADEMARK OFFICE
CERTIFICATE OF CORRECTION

PATENT NO. : 4,388,189
DATED : June 14, 1983
INVENTOR(S) : TAKEYUKI KAWAGUCHI, HIROYOSHI MINEMATSU, YUZURU HAYASHI and SHIGEYOSHI HARA It is certified that error appears in the above-identified patent and that said Letters Patent is hereby corrected as shown below:

On the title page insert Item [73] as follows:

Assignee: --TEIJIN LIMITED, Osaka, Japan--.

Signed and Sealed this

Third Day of April 1984

[SEAL]

Attest:

GERALD J. MOSSINGHOFF

Attesting Officer

Commissioner of Patents and Trademarks